United States Patent
Enjoji et al.

(10) Patent No.: US 6,964,824 B2
(45) Date of Patent: Nov. 15, 2005

(54) FUEL CELL AND METHOD OF OPERATING THE SAME

(75) Inventors: Naoyuki Enjoji, Utsunomiya (JP); Yoshinori Wariishi, Utsunomiya (JP); Masaharu Suzuki, Utsunomiya (JP); Yuichiro Kosaka, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/641,591

(22) Filed: Aug. 15, 2003

(65) Prior Publication Data
US 2004/0038113 A1 Feb. 26, 2004

(30) Foreign Application Priority Data
Aug. 21, 2002 (JP) .......................... 2002-240988

(51) Int. Cl.[7] .......................... H01M 2/00; H01M 2/02; H01M 2/14
(52) U.S. Cl. .............................. 429/34; 429/12; 429/38
(58) Field of Search .......................... 429/34, 38, 39, 429/12

(56) References Cited

U.S. PATENT DOCUMENTS

| | | | |
|---|---|---|---|
| 5,527,363 A | * | 6/1996 | Wilkinson et al. .......... 29/623.1 |
| 5,773,160 A | * | 6/1998 | Wilkinson et al. .......... 429/13 |
| 5,776,625 A | * | 7/1998 | Kaufman et al. .......... 429/30 |
| 5,935,726 A | | 8/1999 | Chow et al. .......... 429/13 |
| 6,720,101 B1 | * | 4/2004 | Dong et al. .......... 429/32 |
| 2003/0129475 A1 | | 7/2003 | Enjoji et al. |

FOREIGN PATENT DOCUMENTS

| | | |
|---|---|---|
| JP | 63-236265 B2 | 10/1988 |
| JP | 08-293318 B3 | 11/1996 |
| JP | 11-067260 B4 | 3/1999 |
| JP | 11-185778 B5 | 7/1999 |
| JP | 11-283639 B6 | 10/1999 |
| JP | 2001-023651 B7 | 1/2001 |
| JP | 2002-008682 | 1/2002 |
| JP | 2003-203650 B8 | 7/2003 |

* cited by examiner

Primary Examiner—Patrick Joseph Ryan
Assistant Examiner—Melissa Austin
(74) Attorney, Agent, or Firm—Lahive & Cockfield, LLP; Anthony A. Laurentano, Esq.

(57) ABSTRACT

A fuel cell includes an electrolyte electrode assembly and a pair of first and second separators. First through fourth oxygen-containing gas holes, first through fourth coolant holes, and first through fourth fuel gas holes extend through the fuel cell. The first through fourth oxygen-containing gas holes are selectively used as an oxygen-containing gas supply port or an oxygen-containing gas discharge port to cause an oxygen-containing gas to flow circularly along an electrode surface in an oxygen-containing gas flow field.

14 Claims, 21 Drawing Sheets

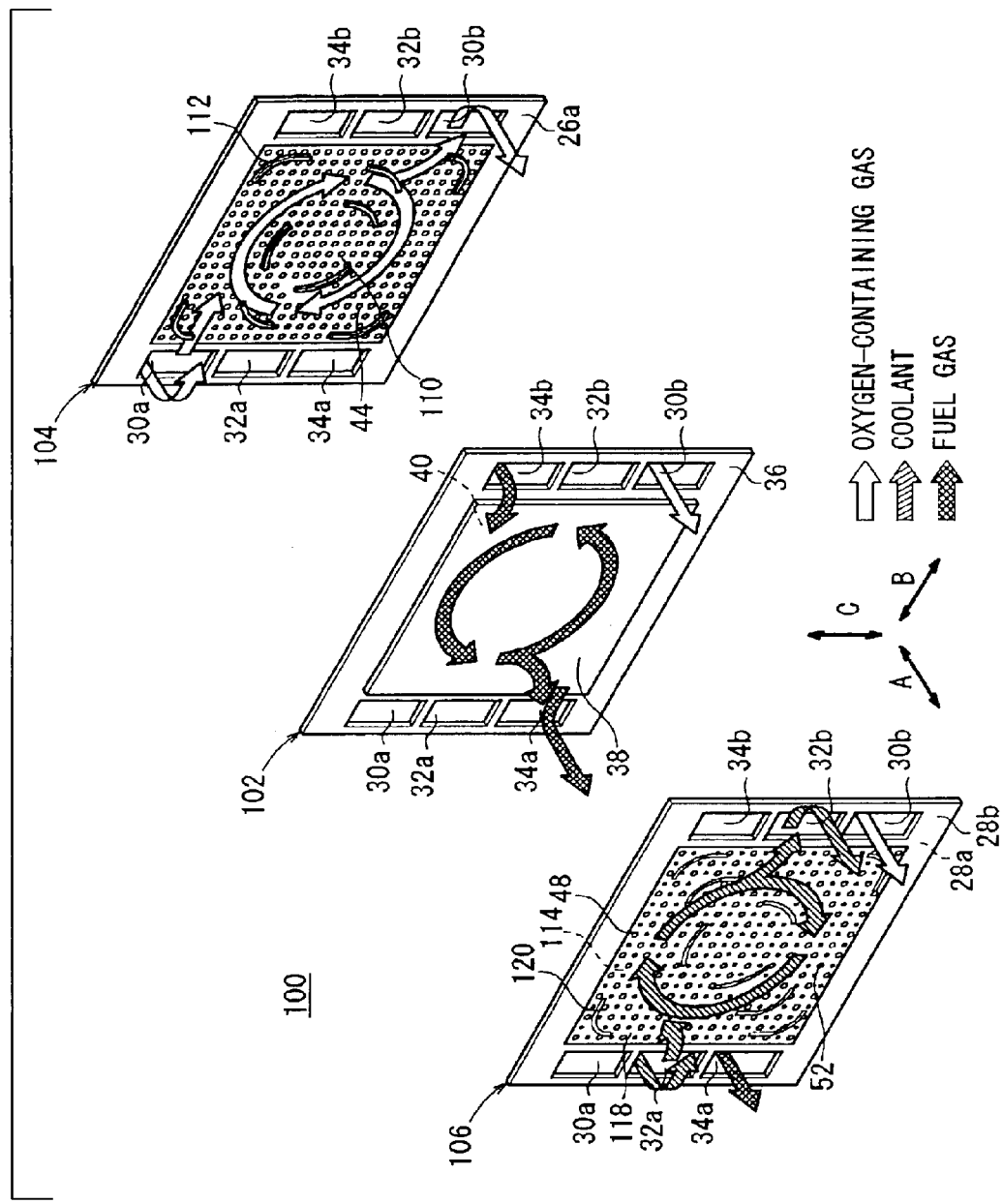

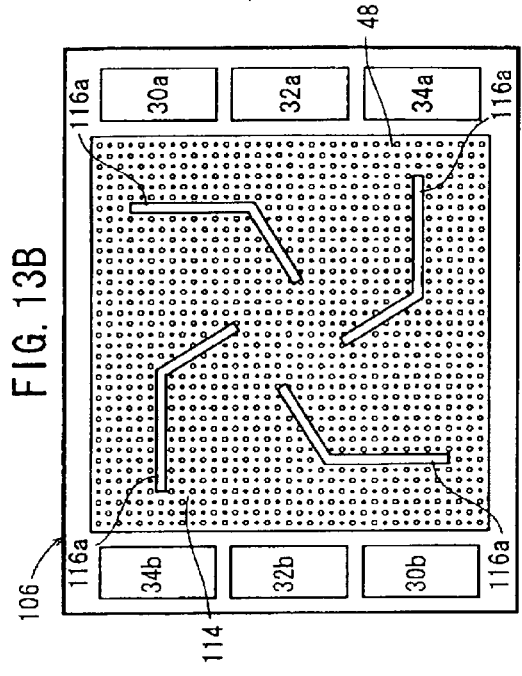
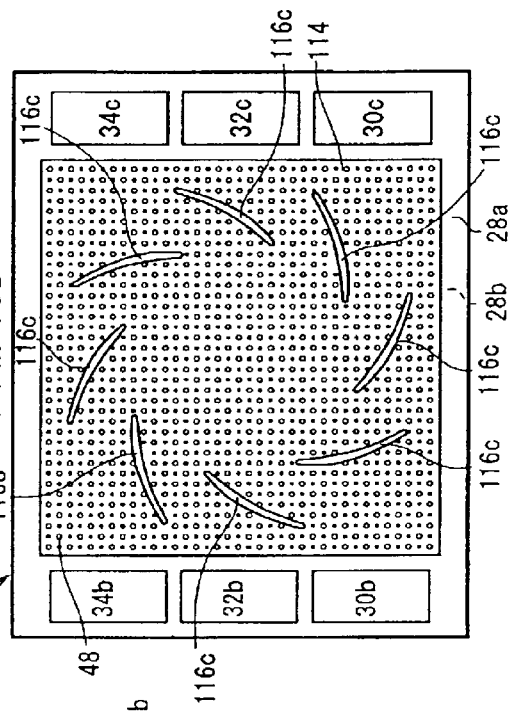
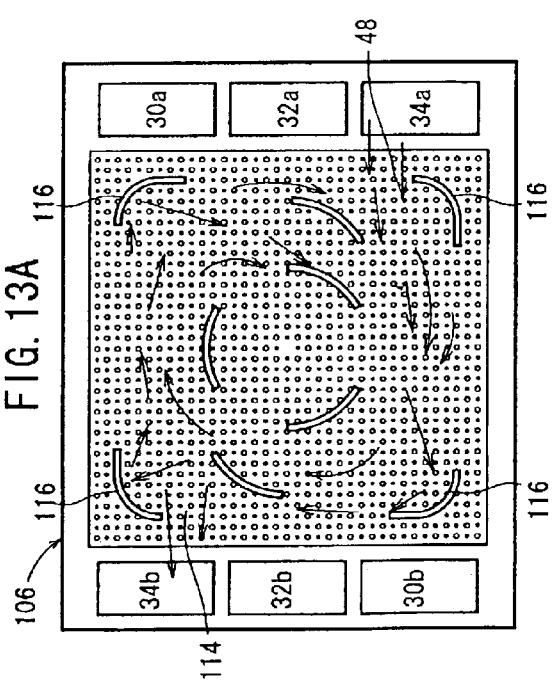
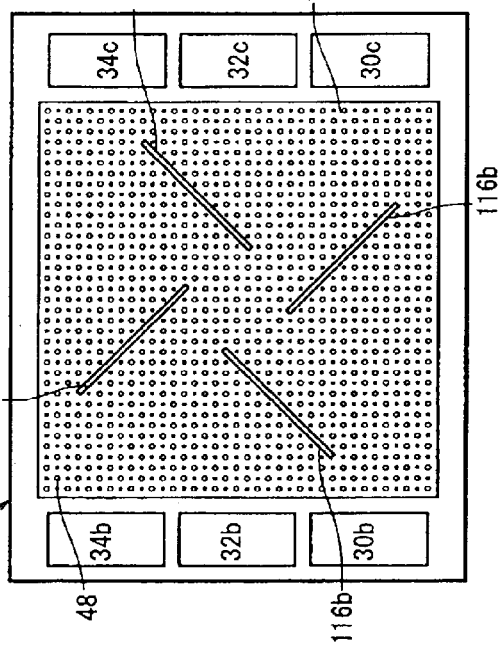

FUEL CELL AND METHOD OF OPERATING THE SAME

BACKGROUND OF THE INVENTION

1. Field of the Invention

The present invention relates to a fuel cell including an electrolyte electrode assembly and separators for sandwiching the electrolyte electrode assembly. The electrolyte electrode assembly includes electrodes and an electrolyte interposed between the electrodes. Further, the present invention relate-to a method of operating the fuel cell.

2. Description of the Related Art

For example, a solid polymer electrolyte fuel cell employs a membrane electrode assembly (electrolyte electrode assembly) which comprises two electrodes (anode and cathode) and an electrolyte membrane interposed between the electrodes. The electrolyte membrane is a polymer ion exchange membrane (proton exchange membrane). The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte membrane, and the electrons flow through an external circuit to the cathode, creating a DC electric current. An oxygen-containing gas or air is supplied to the cathode. At the cathode, the hydrogen ions from the anode combine with the electrons and oxygen to produce water.

The fuel cell has a fuel gas flow field (fluid flow field) defined in each separator for passing the fuel gas therethrough to the anode and an oxygen-containing gas flow field (fluid flow field) defined in each separator for passing the oxygen-containing gas therethrough to the cathode. If necessary, a coolant flow field for passing a coolant therethrough is defined between the separators along the surfaces of the separators.

The electrolyte membrane is required to be appropriately humidified to keep a desired ion conductivity and reduce any structural damage which would otherwise be caused to the electrolyte membrane if it were unduly dried. However, since the reactant gases that are supplied to the fuel cell have low humidity, the electrolyte membrane tends to be dried at inlets of the reactant gas flow fields.

When the fuel cell generates electric energy, i.e., the reactant gases react with each other, the fuel cell produces water. Because the produced water is liable to stay at outlets of the reactant gas flow fields, the electrolyte membrane tends to be excessively humidified, i.e., tends to suffer flooding, at the outlets of the reactant gas flow fields. The flooding possibly causes an insufficient supply of reactant gases to the surfaces of the electrodes.

In an attempt to address the problem, U.S. Pat. No. 5,935,726 (prior art 1) discloses a method of and an apparatus for distributing water to an ion exchange membrane in a fuel cell. According to prior art 1, the direction in which an oxygen-containing gas flows through an oxygen-containing gas flow field is periodically reversed to prevent excessive drying of an electrolyte membrane in the vicinity of a gas inlet and also to prevent flooding in the vicinity of a gas outlet for thereby uniformizing a distribution of water in the fuel cell.

According to prior art 1, however, since a switching mechanism (solenoid-operated directional control valve or the like) is used to change the direction of the flow of the oxygen-containing gas, the flow of the oxygen-containing gas occasionally stops in the oxygen-containing gas flow field. Because of such occasions, the supply of the oxygen-containing gas becomes unstable, making it impossible for the fuel cell to keep a stable output of electric energy.

Japanese laid-open patent publication No. 2002-8682 (prior art 2) discloses a solid oxide fuel cell. As shown in FIG. 21 of the accompanying drawings, the solid oxide fuel cell has as a circular separator 1 having a total of seven fuel gas recesses 3 including a central fuel gas recess 3 and six fuel gas recesses 3 angularly equally spaced on a circle concentric with the central fuel gas recess 3, all defined in a circular surface 1a thereof which faces an electrode of the fuel cell. The recesses 3 are connected with each other by a fuel gas pipe 4 disposed in the separator 1 and connected to a fuel gas supply port 5.

The separator 1 also has a plurality of spiral fuel gas grooves 6 defined in the surface 1a and extending from each of the recesses 3. The spiral fuel gas grooves 6 have ends opening into the recesses 3 and opposite ends connected to fuel gas annular grooves 7 defined in the surface 1a and extending coaxially with the central fuel gas recess 3.

When a fuel gas is supplied from the fuel gas supply port 5 to the fuel gas pipe 4, the fuel gas flows through the fuel gas pipe 4 into the recesses 3. The fuel gas supplied to the recesses 3 is distributed into the spiral fuel gas grooves 6, from which the fuel gas is discharged into the fuel gas annular grooves 7.

In as much as the fuel gas is supplied from the recesses 3 in the separator 1 to the spiral fuel gas grooves 6, the fuel gas can uniformly be distributed over the entire electrode surfaces for generating electric energy.

According to prior art 2, however, the fuel gas pipe 4 is disposed in the separator 1, the seven recesses 3 are defined in the surface 1a, and the spiral fuel gas grooves 6 extend around the recesses 3. Therefore, the separator 1 is considerably complex in structure, and hence is expensive to manufacture.

SUMMARY OF THE INVENTION

It is a major object of the present invention to provide a fuel cell which has a relatively simple and small structure and is capable of keeping electrode surfaces in a uniform state and of producing a high stable output of electric energy.

According to the present invention, when a fluid, which comprises at least one of an oxygen-containing gas, a fuel gas, and a coolant is supplied to and discharged from fluid holes selected from a plurality of fluid holes positioned outside of the electrodes and extending through separators of a fuel cell, the fluid flows circularly along a surface of an electrode in at least one fluid flow field that is connected to the selected fluid holes. It is possible to uniformize the distribution of current densities, the distribution of produced water, the distribution of humidities, and the distribution of temperatures on the electrode surfaces. Thus, the characteristics of the fuel cell to generate electric energy are improved. The power generation is uniformly performed over the entire electrode surfaces, and the entire electrode surfaces are uniformly utilized. Consequently, the durability of the electrolyte electrode assembly is effectively improved.

The selected fluid holes are fixedly used as the fluid supply port and the fluid discharge port, respectively, for causing the fluid to flow circularly in the fluid flow field. Therefore, the structure of the fluid flow field is simplified, easily making it possible to reduce the size of the overall fuel cell.

The fluid holes are selectively used successively as at least one fluid supply port and at least one fluid discharge port for causing the fluid to flow circularly continuously in the fluid flow field. When the fluid holes are selectively used, the flow of the fluid is not stopped, so that the fuel cell can reliably produce a stable output with a simple process and arrangement.

The fluid holes may include at least one inner hole defined in the electrodes for use as the fluid supply port or the fluid discharge port. The inner hole serves to prevent the fluid from staying centrally on the surfaces of the electrodes. The surfaces of the electrodes are thus kept in a uniform state for increased fuel cell performance.

The fluid flow field is defined by an embossed structure on the separator. The embossed structure allows the fluid to flow in directions that can be changed smoothly and reliably.

The embossed structure includes guide ribs. The guide ribs allow the fluid to flow circularly in the fluid flow field smoothly and reliably, making it possible to distribute the fluid well over the entire surface of the electrode under uniform conditions.

The fuel cell may include a fuel gas flow field and an oxygen-containing gas flow field for being supplied with a fuel gas and an oxygen-containing gas, respectively, which flow as substantial counterflows, respectively, through the fuel gas flow field and the oxygen-containing gas flow field. Consequently, water moves optimally between the fuel gas flow field and the oxygen-containing gas flow field across the electrolyte electrode assembly, allowing the fuel cell to operate with the supply of reactant gases having low or no humidity.

The fuel cell may further include a coolant flow field for being supplied with a coolant flowing substantially parallel to the oxygen-containing gas through the coolant flow field. While the downstream side of the oxygen-containing gas flow field is made highly humid, it has a high temperature which lowers the relative humidity thereof, thus effectively preventing water condensation on the downstream side of the oxygen-containing gas flow field.

The electrolyte electrode assembly and the separators may be stacked vertically. The vertical stack is effective to prevent condensed water from staying or remaining stagnant downstream as in a structure where the stack lies horizontally, and allows condensed water to move smoothly and be discharged well.

The numbers of fluid supply ports and fluid discharge ports which are simultaneously used are greater when the fuel cell produces a high output than when the fuel cell produces a low output. Any pressure loss in the holes is thus reduced, resulting in an increased distribution of the fluid.

The interval of time at which the supply and discharge of the fluid to and from the fluid holes is switched is changed depending on a load on the fuel cell, or the numbers of fluid supply ports and fluid discharge ports which are simultaneously used are changed depending on a load on the fuel cell. It is thus possible to maintain an optimum distribution of the fluid the surfaces of the electrodes to prepare for a change in the output of the fuel cell.

When the fluid flows circularly in the fluid flow field, the fluid is drawn from the fluid supply port due to the inertia of the fluid flow. Therefore, the fluid can flow in the fluid flow field at a rate higher than possible with a fluid supply pump, which may be small in size and may save energy.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is an exploded perspective view showing main components of a fuel cell according to a second embodiment of the present invention;

FIG. 13A is a front view showing a rib configuration of a second separator of the fuel cell shown in FIG. 12;

FIGS. 13B through 13D are front views of second separators with other rib configurations;

DESCRIPTION OF THE PREFERRED EMBODIMENTS

Figure 1:
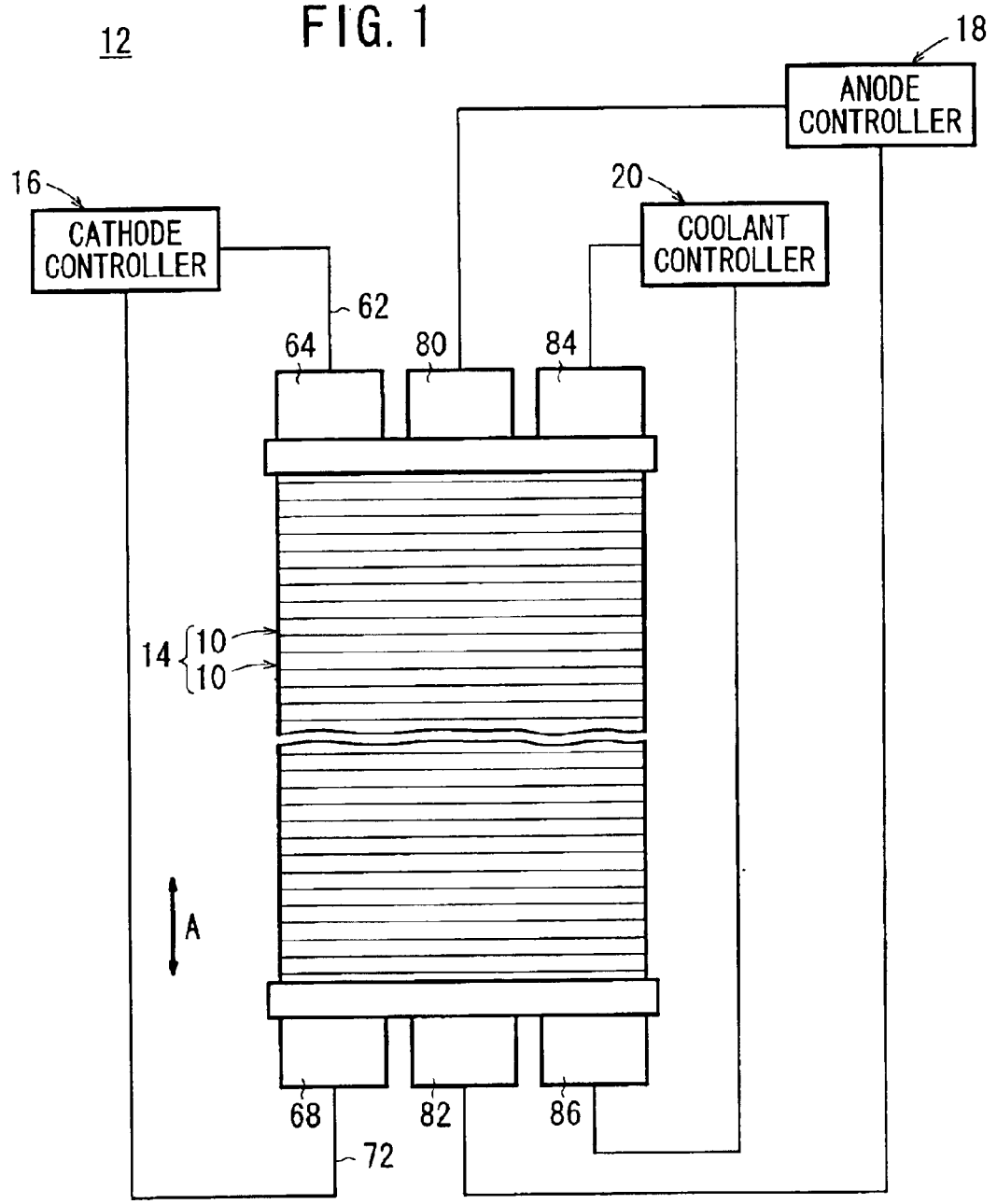
FIG. 1 is a schematic view, partly in block form, of a fuel cell system incorporating a fuel cell according to a first embodiment of the present invention.

FIG. 1 schematically shows, partly in block form, of a fuel cell system 12 incorporating a fuel cell 10 according to a first embodiment of the present invention.

As shown in FIG. 1, the fuel cell system 12 includes a plurality of fuel cells 10 which are stacked vertically in the direction indicated by the arrow A, into a fuel cell stack 14. The fuel cell stack 14 is connected to a cathode controller 16 for supplying and discharging an oxygen-containing gas such as air, an anode controller 18 for supplying and discharging a fuel gas such as a hydrogen-containing gas, and a coolant controller 20 for supplying and discharging a coolant such as pure water, ethylene glycol, oil.

Figure 2:
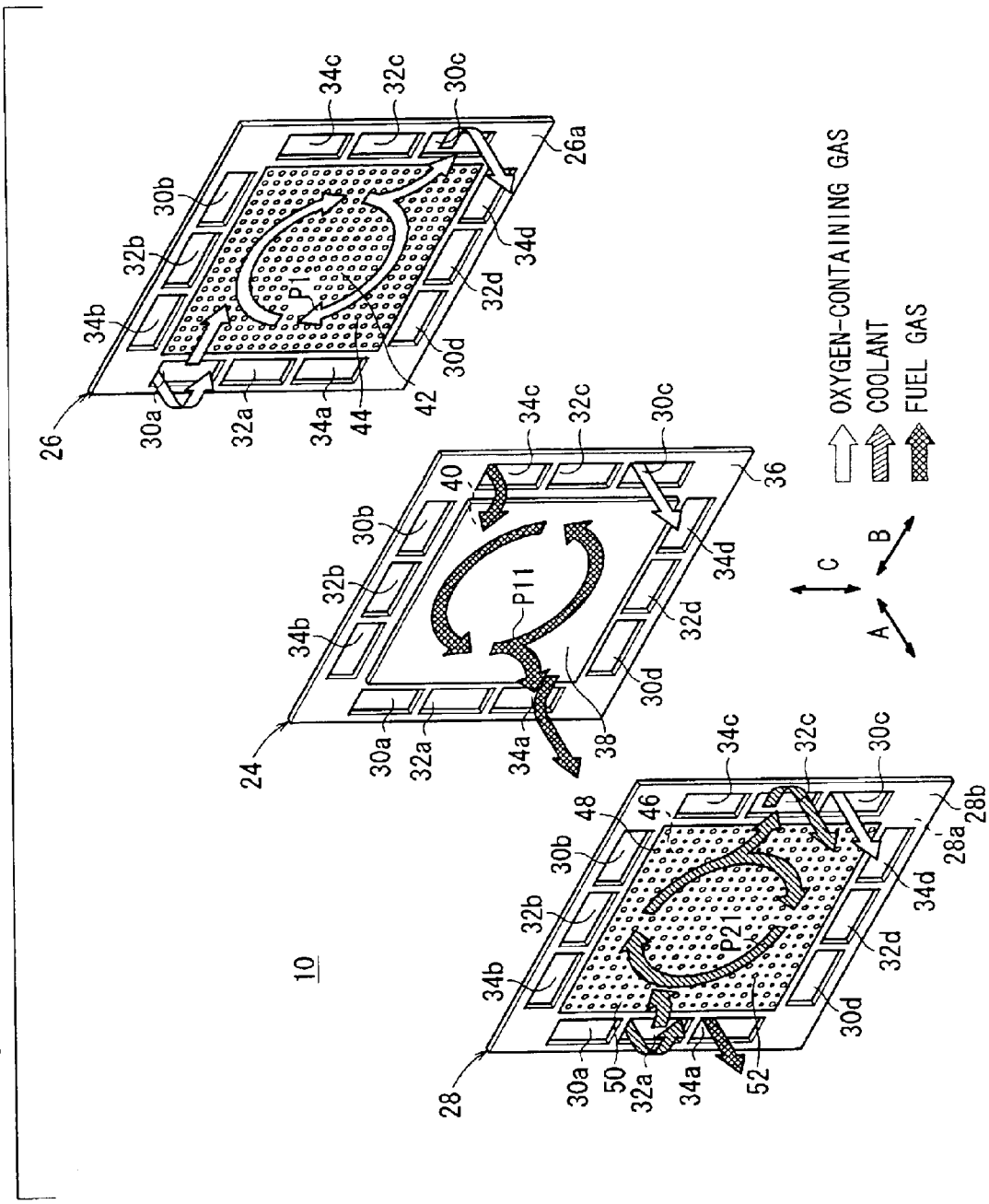
FIG. 2 is an exploded perspective view showing main components of the fuel cell.

As shown in FIG. 2, each of the fuel cells 10 comprises a substantially square-shaped membrane electrode assembly (electrolyte electrode assembly) 24, and substantially square-shaped first and second separators 26, 28 of metal which sandwich the membrane electrode assembly 24 therebetween. Seals (not shown) are interposed between the membrane electrode assembly 24 and the first and second separators 26, 28 to cover the outer peripheral edges of fluid holes and electrode surfaces, which will be described later on.

The fuel cell 10 has, defined in one end thereof in the direction indicated by the arrow B, a first oxygen-containing gas hole 30a for passing the oxygen-containing gas therethrough, a first coolant hole 32a for passing the coolant therethrough, and a first fuel gas hole 34a for passing the fuel gas therethrough. The first oxygen-containing gas hole 30a, the first coolant hole 32a, and the first fuel gas hole 34a extend through the membrane electrode assembly 24 and the first and second separators 26, 28 in the direction indicated by the arrow A, and are arranged in the direction indicated by the arrow C.

The fuel cell 10 also has, defined in one end thereof in the direction indicated by the arrow C, a second fuel gas hole 34b, a second coolant hole 32b, and a second oxygen-containing gas hole 30b which extend through the membrane electrode assembly 24 and the first and second separators 26, 28 in the direction indicated by the arrow A, and are arranged in the direction indicated by the arrow B.

The fuel cell 10 also has, defined in the opposite end thereof in the direction indicated by the arrow B, a third oxygen-containing gas hole 30c, a third coolant hole 32c, and a third fuel gas hole 34c which extend through the membrane electrode assembly 24 and the first and second separators 26, 28 in the direction indicated by the arrow A, and are arranged in the direction indicated by the arrow C. The fuel cell 10 also has, defined in the opposite end thereof in the direction indicated by the arrow C, a fourth oxygen-containing gas hole 30d, a fourth coolant hole 32d, and a fourth fuel gas hole 34d which extend through the membrane electrode assembly 24 and the first and second separators 26, 28 in the direction indicated by the arrow A, and are arranged in the direction indicated by the arrow B.

Figure 3:
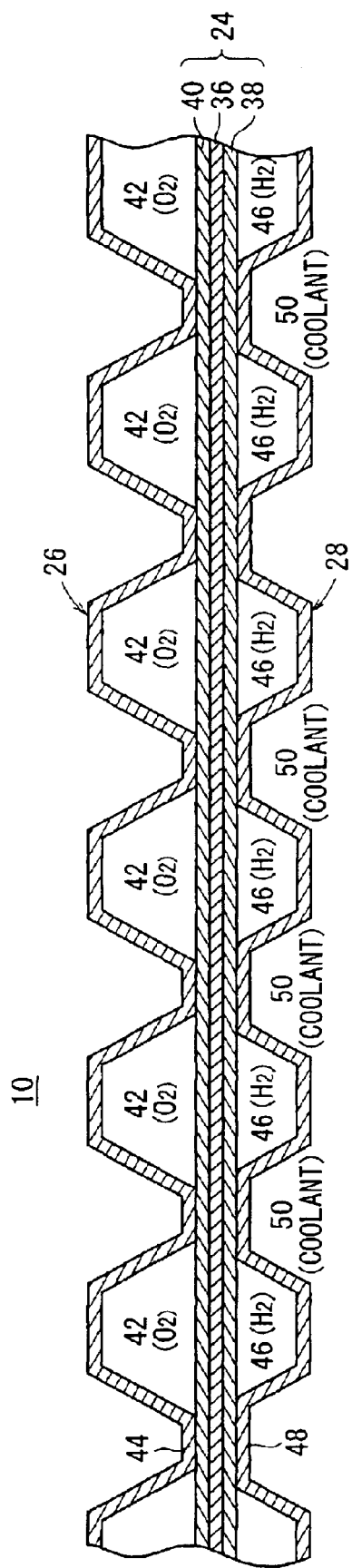
FIG. 3 is an cross-sectional view showing main components of the fuel cell.

As shown in FIGS. 2 and 3, the membrane electrode assembly 24 comprises an anode 38, a cathode 40, and an ion exchange membrane 36 of a solid electrolyte interposed between the anode 38 and the cathode 40. The ion exchange membrane 36 is formed by impregnating a thin membrane of perfluorosulfonic acid with water, for example. Each of the anode 38 and cathode 40 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 38 and the electrode catalyst layer of the cathode 40 are fixed to both surfaces of the ion exchange membrane 36, respectively.

The first separator 26 has, on its surface 26a facing the cathode 40, an oxygen-containing gas flow field (fluid flow field) 42 which is connectable to the first through fourth oxygen-containing gas holes 30a, 30b, 30c, 30d. The oxygen-containing gas flow field 42 is defined by a plurality of bosses (embossed structure) 44. The oxygen-containing gas flows circularly through the oxygen-containing gas flow field 42.

Figure 4:
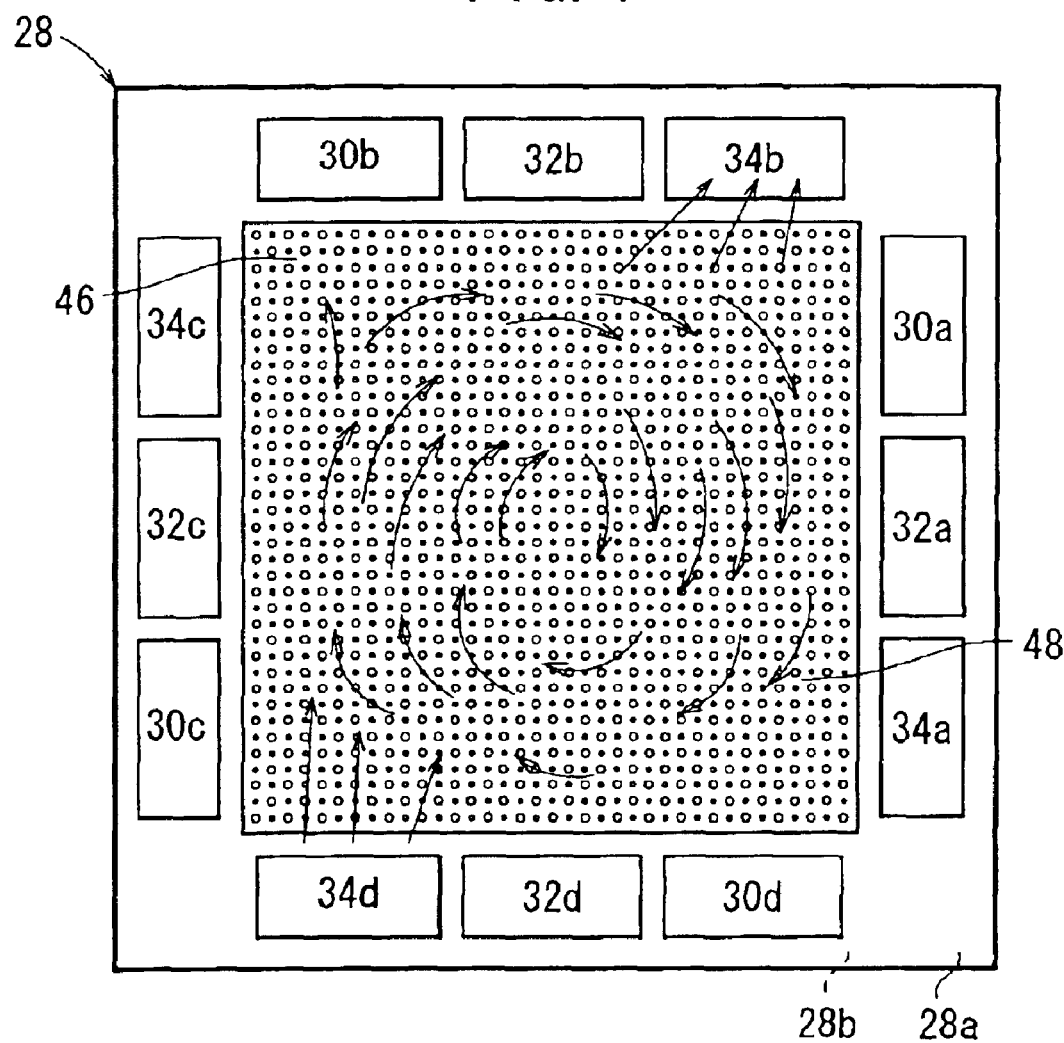
FIG. 4 is a front view of a second separator of the fuel cell.

As shown in FIGS. 2 and 4, the second separator 28 has, on its surface 28a facing the anode 38, a fuel gas flow field (fluid flow field) 46 which is connectable to the first through fourth fuel gas holes 34a, 34b, 34c, 34d. The fuel gas flow field 46 is defined by a plurality of bosses (embossed structure) 48. The fuel gas flows circularly through the fuel gas flow field 46.

As shown in FIG. 2, the second separator 28 has, on its surface 28b opposite to the surface 28a, a coolant flow field (fluid flow field) 50 which is defined by a plurality of bosses (embossed structure) 52 that are smaller in diameter than the bosses 48. The coolant flows circularly through the coolant flow field 50.

The cathode controller 16 shown in FIG. 1 has a compressor (not shown) for supplying air, for example, as the oxygen-containing gas. The compressor is connected to a first switching mechanism 64 by a supply pipe 62. The first switching mechanism 64 comprises a rotary switching mechanism, and is mounted on a supply side of the fuel cell stack 14 for connecting the supply pipe 62 selectively to the first through fourth oxygen-containing gas holes 30a, 30b, 30c, 30d.

Specifically, the first switching mechanism 64 operates to switch the supply pipe 62 selectively into a position for connection to only the first oxygen-containing gas hole 30a, a position for connection to both of the first and second oxygen-containing gas holes 30a, 30b, a position for connection to only the second oxygen-containing gas hole 30b, a position for connection to both of the second and third oxygen-containing gas holes 30b, 30c, a position for connection to only the third oxygen-containing gas hole 30c, a position for connection to both of the third and fourth oxygen-containing gas holes 30c, 30d, and a position for connection to only the fourth oxygen-containing gas hole 30d.

The first switching mechanism 64 may alternatively comprise a solenoid-operated directional control valve (not shown) for connecting the supply pipe 62 selectively to the first through fourth oxygen-containing gas holes 30a, 30b, 30c, 30d.

A second switching mechanism 68 is operatively mounted on a discharge side of the fuel cell stack 14 for selectively connecting the first through fourth oxygen-containing gas holes 30a, 30b, 30c, 30d to a discharge pipe 72 that is connected to the cathode controller 16.

Figure 5:
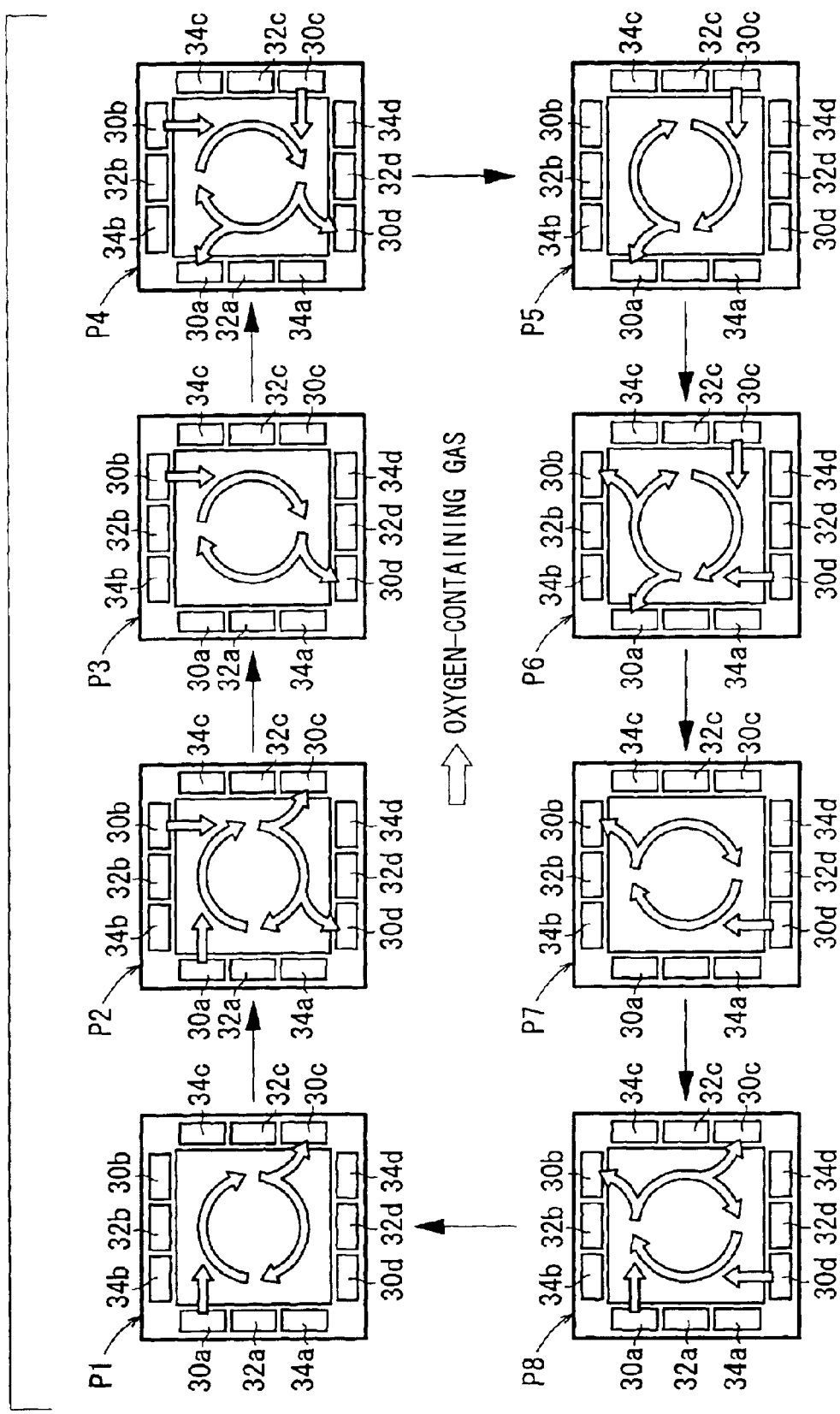
FIG. 5 is a view illustrative of the manner in which the direction of a flow in an oxygen-containing gas flow field is changed.

The first and second switching mechanisms 64, 68 are actuated to selectively use the first through fourth oxygen-containing gas holes 30a, 30b, 30c, 30d as an oxygen-containing gas supply port (fluid supply port) and/or an oxygen-containing gas discharge port (fluid discharge port). Specifically, as shown in FIG. 5, the first and second switching mechanisms 64, 68 selectively use the first through fourth oxygen-containing gas holes 30a, 30b, 30c, 30d successively in first through eighth positions P1 through P8 according to a pattern shown in FIG. 6.

In the first position P1, the oxygen-containing gas is supplied through only the first oxygen-containing gas hole 30a as the oxygen-containing gas supply port and the oxygen-containing gas is discharged through only the third oxygen-containing gas hole 30c as the oxygen-containing gas discharge port. In the second position P2, the oxygen-containing gas is supplied through the first and second oxygen-containing gas holes 30a, 30b as the oxygen-containing gas supply ports and the oxygen-containing gas is discharged through the third and fourth oxygen-containing gas holes 30c, 30d as the oxygen-containing gas discharge ports.

In the third position P3, the oxygen-containing gas is supplied through only the second oxygen-containing gas hole 30b as the oxygen-containing gas supply port and the oxygen-containing gas is discharged through only the fourth oxygen-containing gas hole 30d as the oxygen-containing gas discharge port. In the fourth position P4, the oxygen-containing gas is supplied through the second and third oxygen-containing gas holes 30b, 30c as the oxygen-containing gas supply ports and the oxygen-containing gas is discharged through the fourth and first oxygen-containing gas holes 30d, 30a as the oxygen-containing gas discharge ports.

In the fifth position P5, the oxygen-containing gas is supplied through only the third oxygen-containing gas hole 30c as the oxygen-containing gas supply port and the oxygen-containing gas is discharged through only the first oxygen-containing gas hole 30a as the oxygen-containing gas discharge port. In the sixth position P6, the oxygen-containing gas is supplied through the third and fourth oxygen-containing gas holes 30c, 30d as the oxygen-containing gas supply ports and the oxygen-containing gas is discharged through the first and second oxygen-containing gas holes 30a, 30b as the oxygen-containing gas discharge ports.

In the seventh position P7, the oxygen-containing gas is supplied through only the fourth oxygen-containing gas hole 30d as the oxygen-containing gas supply port and the oxygen-containing gas is discharged through only the second oxygen-containing gas hole 30b as the oxygen-containing gas discharge port. In the eighth position P8, the oxygen-containing gas is supplied through the fourth and first oxygen-containing gas holes 30d, 30a as the oxygen-containing gas supply ports and the oxygen-containing gas is discharged through the second and third oxygen-containing gas holes 30b, 30c as the oxygen-containing gas discharge ports.

Figure 7:
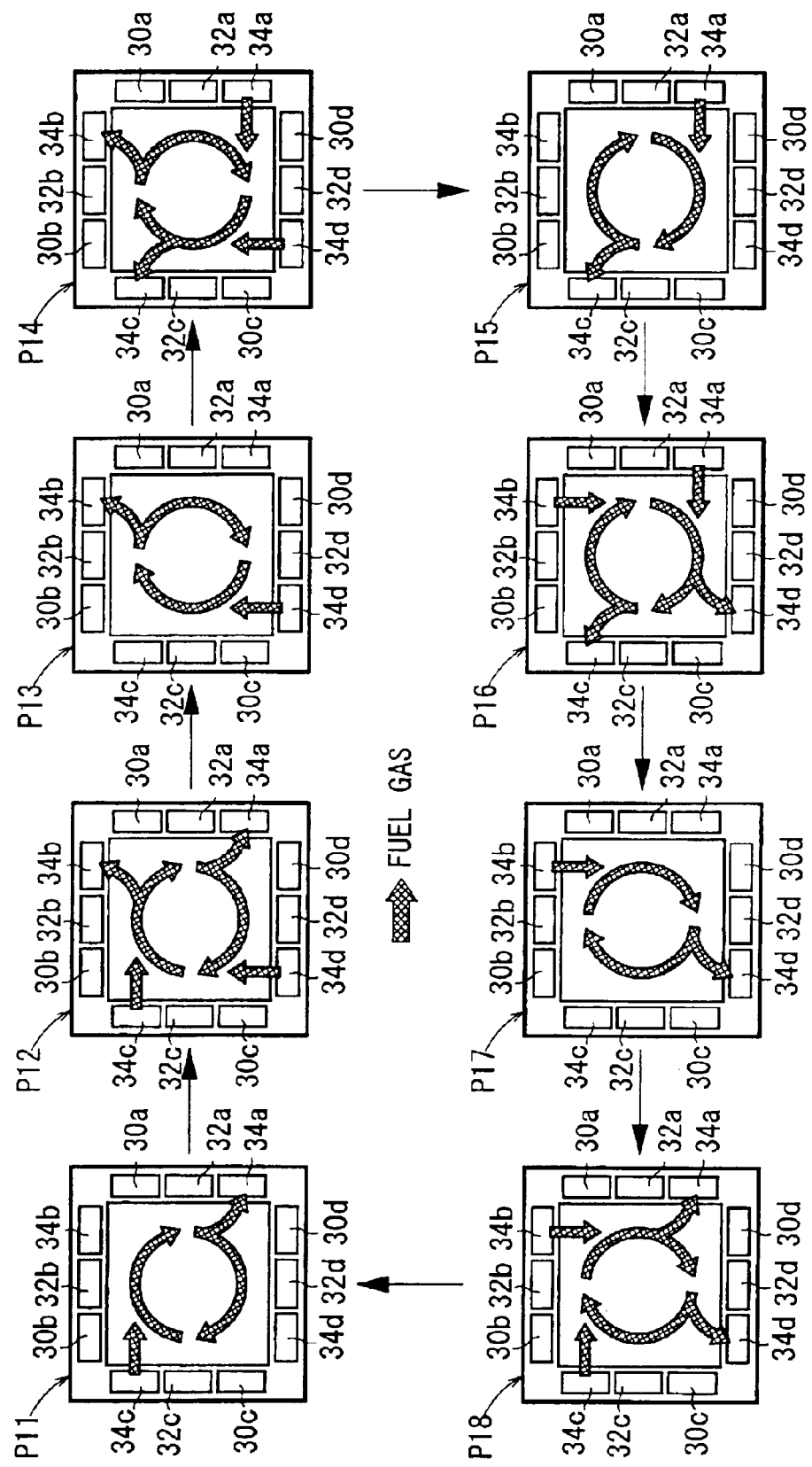
FIG. 7 is a view illustrative of the manner in which the direction of a flow in a fuel gas flow field is changed.

As shown in FIG. 1, the anode controller 18 is constructed similarly to the cathode controller 16, and is connected to a first switching mechanism 80 which is coupled to a fuel gas tank, not shown, and mounted on the supply side of the fuel cell stack 14, and a second switching mechanism 82 mounted on the discharge side of the fuel cell stack 14. The first and second switching mechanisms 80, 82 selectively use the first through fourth fuel gas holes 34a, 34b, 34c, 34d successively in first through eighth positions P11 through P18 as shown in FIG. 7.

In the first position P11, the fuel gas is supplied through only the third fuel gas hole 34c as a fuel gas supply port (fluid supply port) and the fuel gas is discharged through only the first fuel gas hole 34a as a fuel gas discharge port (fluid discharge port). In the second position P12, the fuel gas is supplied through the third and fourth fuel gas holes 30c, 30d as the fuel gas supply ports and the fuel gas is discharged through the first and second fuel gas holes 34a, 34b as the fuel gas discharge ports.

In the third position P13, the fuel gas is supplied through only the fourth fuel gas hole 34d as the fuel gas supply port and the fuel gas is discharged through only the second fuel gas hole 34b as the fuel gas discharge port. In the fourth position P14, the fuel gas is supplied through the fourth and first fuel gas holes 34d, 34a as the fuel gas supply ports and the fuel gas is discharged through the second and third fuel gas holes 34b, 34c as the fuel gas discharge ports.

In the fifth position P15, the fuel gas is supplied through only the first fuel gas hole 34a as the fuel gas supply port and the fuel gas is discharged through only the third fuel gas hole 34c as the fuel gas discharge port. In the sixth position P16, the fuel gas is supplied through the first and second fuel gas holes 34a, 34b as the fuel gas supply ports and the fuel gas is supplied through the third and fourth fuel gas holes 34c, 34d as the fuel gas discharge ports.

In the seventh position P17, the fuel gas is supplied through only the second fuel gas hole 34b as the fuel gas supply port and the fuel gas is discharged through only the fourth fuel gas hole 34d as the fuel gas discharge port. In the eighth position P18, the fuel gas is supplied through the second and third fuel gas holes 34b, 34c as the fuel gas supply ports and the fuel gas is discharged through the fourth and first fuel gas holes 34d, 34a as the fuel gas discharge ports.

Figure 8:
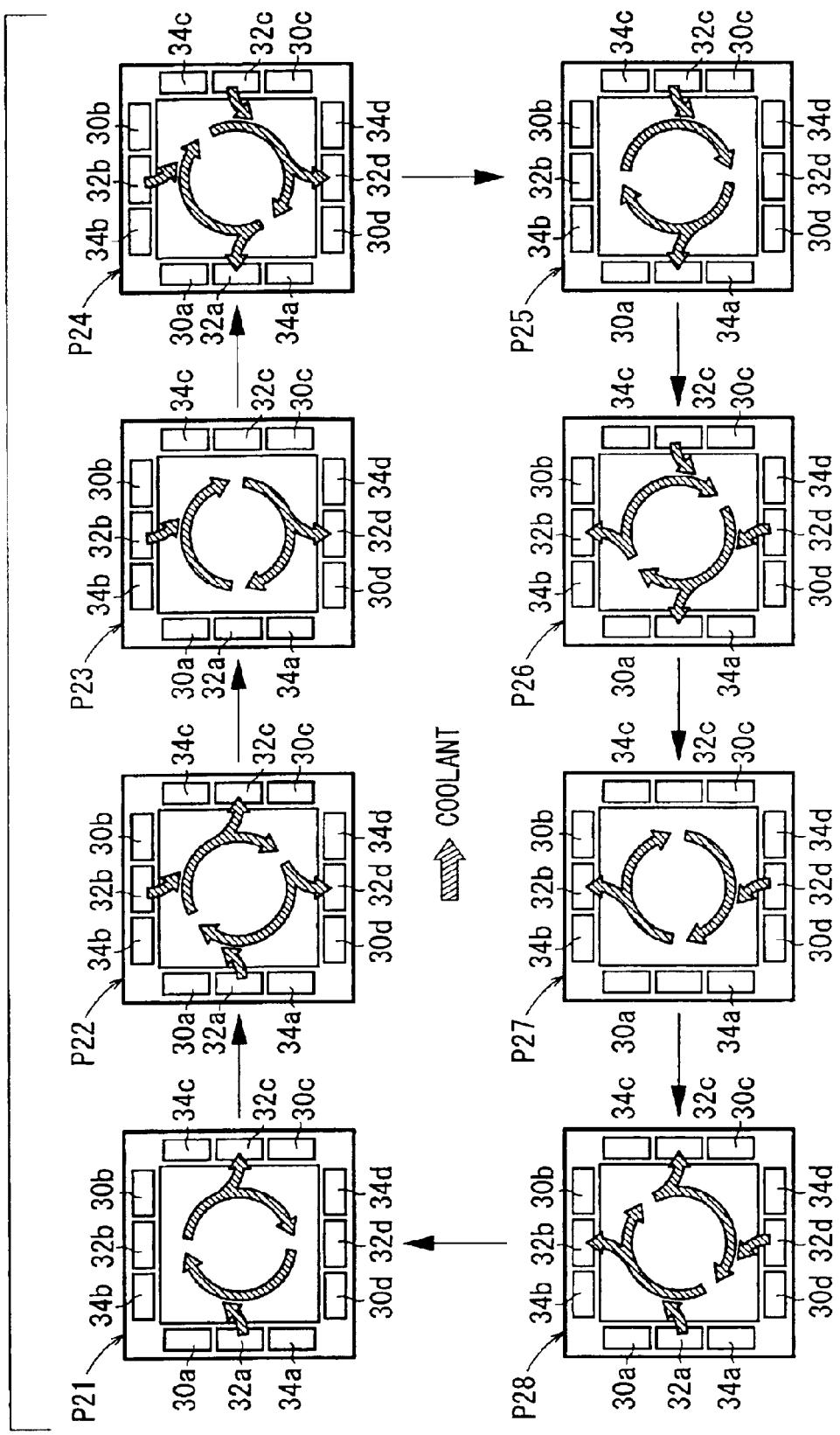
FIG. 8 is a view illustrative of the manner in which the direction of a flow in a coolant flow field is changed.

As shown in FIG. 1, the coolant controller 20 is constructed similarly to the cathode controller 16 and the anode controller 18, and is connected to a first switching mechanism 84 which is coupled to a coolant tank, not shown, and mounted on the supply side of the fuel cell stack 14, and a second switching mechanism 86 mounted on the discharge side of the fuel cell stack 14. The first and second switching mechanisms 84, 86 selectively use the first through fourth coolant holes 32a, 32b, 32c, 32d successively in first through eighth positions P21 through P28 as shown in FIG. 8.

In the first position P21, the coolant is supplied through only the first coolant hole 32a as a coolant supply port (fluid supply port) and the coolant is discharged through only the third coolant hole 32c as a coolant discharge port (fluid discharge port). In the second position P22, the coolant is supplied through the first and second coolant holes 32a, 32b as the coolant supply ports and the coolant is discharged through the third and fourth coolant holes 32c, 32d as the coolant discharge ports.

In the third position P23, the coolant is supplied through only the second coolant hole 32b as the coolant supply port and the coolant is discharged through only the fourth coolant hole 32d as the coolant discharge port. In the fourth position P24, the coolant is supplied through the second and third coolant holes 32b, 32c as the coolant supply ports and the coolant is discharged through the fourth and first coolant holes 32d, 32a as the coolant discharge ports.

In the fifth position P25, the coolant is supplied through only the third coolant hole 32c as the coolant supply port and the coolant is discharged through only the first coolant hole 32a as the coolant discharge port. In the sixth position P26, the coolant is supplied through the third and fourth coolant holes 32c, 32d as the coolant supply ports and the coolant is discharged through the first and second coolant holes 32a, 32b as the coolant discharge ports.

In the seventh position P27, the coolant is supplied through only the fourth coolant hole 32d as the coolant supply port and the coolant is discharged through only the second coolant hole 32b as the coolant discharge port. In the eighth position P28, the coolant is supplied through the fourth and first coolant holes 32d, 32a as the coolant supply ports and the coolant is discharged through the second and third coolant holes 32b, 32c as the coolant discharge ports.

Operation of the fuel cell system 12 with respect to a method of operating the fuel cell 10 according to the first embodiment of the present invention will be described below.

As shown in FIG. 2, the first through fourth oxygen-containing gas holes 30a, 30b, 30c, 30d are in the first position P1, the first through fourth fuel gas holes 34a, 34b, 34c, 34d are in the first position P11, and the first through fourth coolant holes 32a, 32b, 32c, 32d are in the first position P21.

The fuel cell 10 is supplied with an oxygen-containing gas, e.g., an oxygen-containing gas such as air or the like, a fuel gas, e.g., a hydrogen-containing gas, and a coolant, e.g., pure water, ethylene glycol, oil, or the like. The oxygen-containing gas is supplied to the first fuel gas hole 34a extending through the fuel cell 10 in the direction indicated by the arrow A, and introduced into the oxygen-containing gas flow field 42 of the first separator 26.

In the oxygen-containing gas flow field 42, the oxygen-containing gas flows circularly along the bosses 44 and moves along the cathode 40 of the membrane electrode assembly 24. While flowing circularly, the oxygen-containing gas is partly discharged into the third oxygen-containing gas hole 30c. Immediately after the fuel cell 10 starts operating, the oxygen-containing gas tends to move in the oxygen-containing gas flow field 42 substantially linearly from the first fuel gas hole 34a to the third oxygen-containing gas hole 30c.

As shown in FIG. 2, the fuel gas is supplied to the third fuel gas hole 34c which extends through the fuel cell 10 in the direction indicated by the arrow A, and introduced into the fuel gas flow field 46 of the second separator 28. In the fuel gas flow field 46, the fuel gas flows circularly along the bosses 48 and moves along the anode 38 of the membrane electrode assembly 24. While flowing circularly, the fuel gas is partly discharged into the first fuel gas hole 34a. Immediately after the fuel cell 10 starts operating, the fuel gas tends to move in the fuel gas flow field 46 substantially linearly from the third fuel gas hole 34c to the first fuel gas hole 34a.

In the membrane electrode assembly 24, therefore, the oxygen-containing gas supplied to the cathode 40 and the fuel gas supplied to the anode 38 are consumed by an electrochemical reaction in the electrode catalyst layer, generating electric energy (see FIG. 3).

Then, the oxygen-containing gas supplied to and consumed on the cathode 40 is discharged into the third oxygen-containing gas hole 30c (see FIGS. 2 and 5). Similarly, the fuel gas supplied to and consumed on the anode 38 is discharged into the first fuel gas hole 34a (see FIGS. 2 and 7).

The coolant is supplied to the first coolant hole 32a and introduced into the coolant flow field 50 of the second separator 28. The coolant flows circularly along the bosses 52, cools the membrane electrode assembly 24, and thereafter is discharged into the third coolant hole 32c (see FIGS. 2 and 8).

In the first embodiment, the cathode controller 16, the anode controller 18, and the coolant controller 20 are synchronously operated to control the first switching mechanisms 64, 80, 84 and the second switching mechanisms 68, 82, 86 to selectively connect the first through fourth oxygen-containing gas holes 30a, 30b, 30c, 30d, the first through fourth fuel gas holes 34a, 34b, 34c, 34d, and the first through fourth coolant holes 32a, 32b, 32c, 32d.

Figure 6:
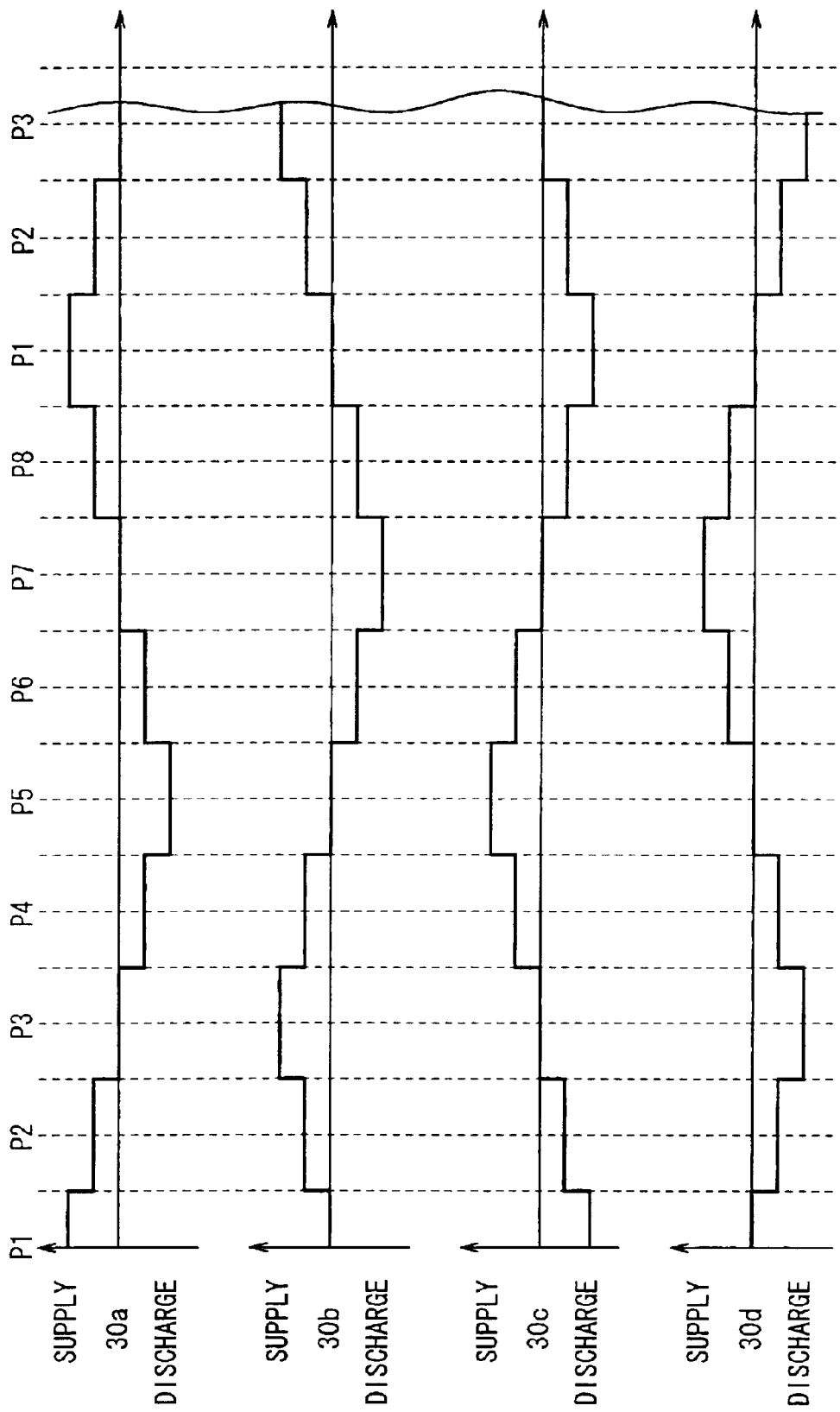
FIG. 6 is a diagram showing a pattern of positions in which oxygen-containing gas ports are selectively used for supplying and discharging an oxygen-containing gas.

Specifically, the cathode controller 16 controls the first and second switching mechanisms 64, 68 to selectively connect the first through fourth oxygen-containing gas holes 30a, 30b, 30c, 30d successively in the first through eighth positions P1 through P8 according to the pattern shown in FIG. 6 (see FIG. 5). Therefore, since the first through fourth oxygen-containing gas holes 30a, 30b, 30c, 30d are selectively used as the oxygen-containing gas supply port and the oxygen-containing gas discharge port, the oxygen-containing gas smoothly flows circularly along the surface of the cathode 40.

As a result, on the surface of the cathode 40, the distribution of current densities, the distribution of produced water, the distribution of humidities, and the distribution of temperatures are uniformized. Thus, the fuel cell 10 has its electric energy generating characteristics effectively improved with a relatively simple arrangement. Furthermore, the fuel cell 10 is also advantageous in that the distribution of electric energy generated by the fuel cell 10 and the distribution of in-plane loads on the membrane electrode assembly 24 are uniformized to allow the membrane electrode assembly 24 to have effectively increased durability.

The anode controller 18 and the coolant controller 20 control the first and second switching mechanisms 80, 82 and the first and second switching mechanisms 84, 86 to selectively switch the first through fourth fuel gas holes 34a, 34b, 34c, 34d and the first through fourth coolant holes 32a, 32b, 32c, 32d successively in the first through eighth positions P11 through P18 and the first through eighth positions P21 through P28 (see FIGS. 7 and 8). Thus, in the fuel gas flow field 46 and the coolant flow field 50, the fuel gas and the coolant smoothly flow circularly along the electrode surfaces. Therefore, various states on the electrode surfaces are maintained uniformly, allowing the fuel cell 10 to have its electric energy generating characteristics effectively improved.

In the oxygen-containing gas flow field 42, as shown in FIGS. 5 and 6, only the first oxygen-containing gas hole 30a is used as the oxygen-containing gas supply port and only the third oxygen-containing gas hole 30c is used as the oxygen-containing gas discharge port in the first position P1. To change the direction of the flow in the oxygen-containing gas flow field 42, the first position P1 changes through the second position P2 to the third position P3.

Therefore, the oxygen-containing gas supply port does not switch directly from the first oxygen-containing gas hole 30a to the second oxygen-containing gas hole 30b, but the first and second oxygen-containing gas holes 30a, 30b are temporarily simultaneously used as the oxygen-containing gas supply ports in the second position P2 before the oxygen-containing gas supply port switches to the second oxygen-containing gas hole 30b.

Similarly, when the third oxygen-containing gas hole 30c used as the oxygen-containing gas discharge port in the first position P1 changes to the fourth oxygen-containing gas hole 30d, the third and fourth oxygen-containing gas holes 30c, 30d are temporarily simultaneously, i.e., overlappingly, used as the oxygen-containing gas discharge port in the second position P2.

Therefore, when the oxygen-containing gas supply port and the oxygen-containing gas discharge port are changed, the flow of the oxygen-containing gas is not stopped, but the oxygen-containing gas can always be supplied to the electrode surface. In the fuel gas flow field 46, likewise, the flow of the fuel gas is not stopped when the fuel gas supply port and the fuel gas discharge port are changed. Consequently, the fuel cell 10 can reliably produce a stable output of electric energy.

The oxygen-containing gas flow field 42, the fuel gas flow field 46, and the coolant flow field 50 are defined by the bosses 44, 48, 52, respectively. These bosses 44, 48, 52 make it possible for the fluids to flow circularly smoothly and reliably in the oxygen-containing gas flow field 42, the fuel gas flow field 46, and the coolant flow field 50.

According to the first embodiment, when the first through fourth oxygen-containing gas holes 30a, 30b, 30c, 30d are selectively switched successively in the first through eighth positions P1 through P8, the first through fourth fuel gas holes 34a, 34b, 34c, 34d and the first through fourth coolant holes 32a, 32b, 32c, 32d are synchronously selectively switched successively in the first through eighth positions P11 through P18 and the first through eighth positions P21 through P28, respectively.

Figure 9:
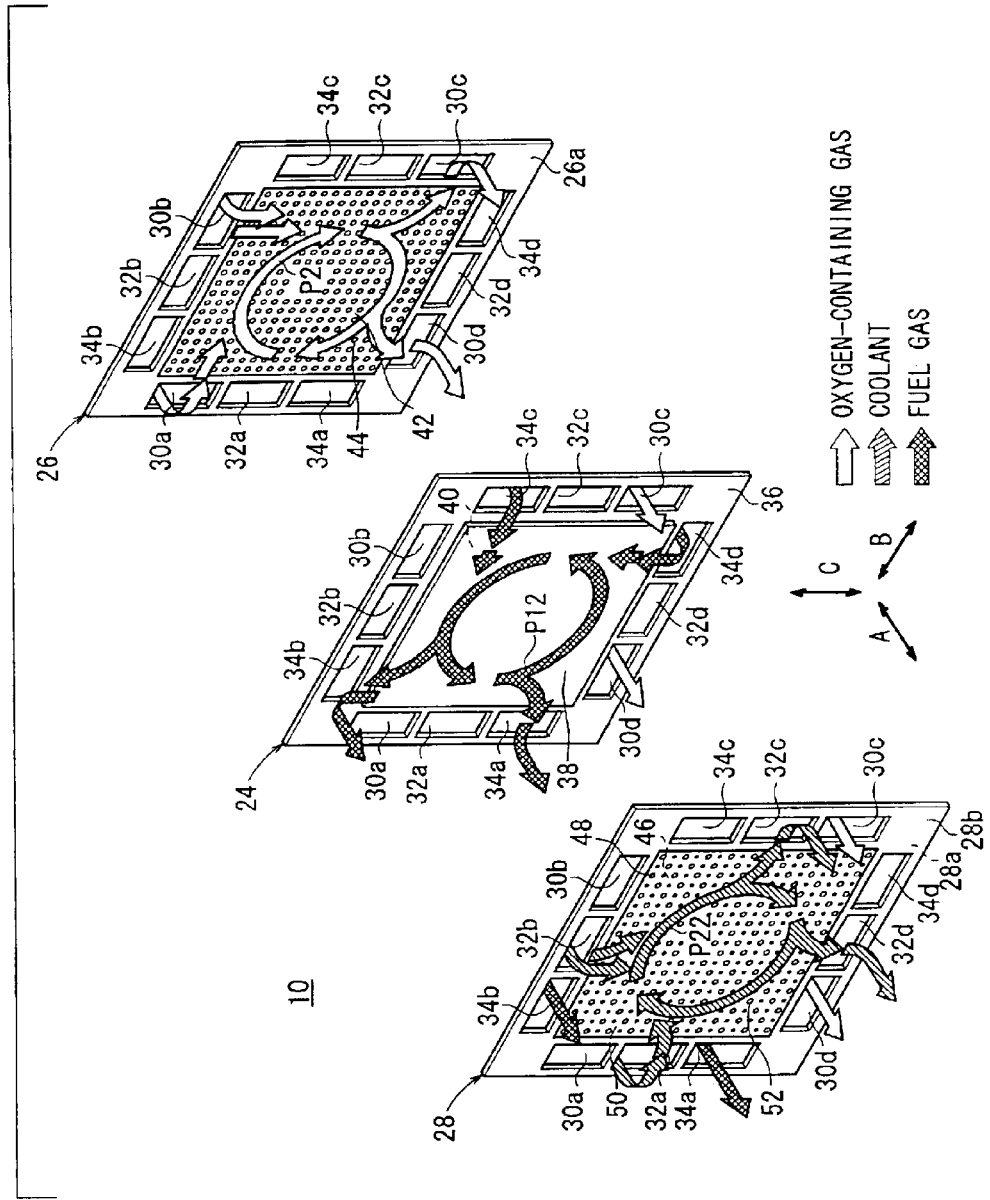
FIG. 9 is an exploded perspective view of the fuel cell in a second position.
Figure 10:
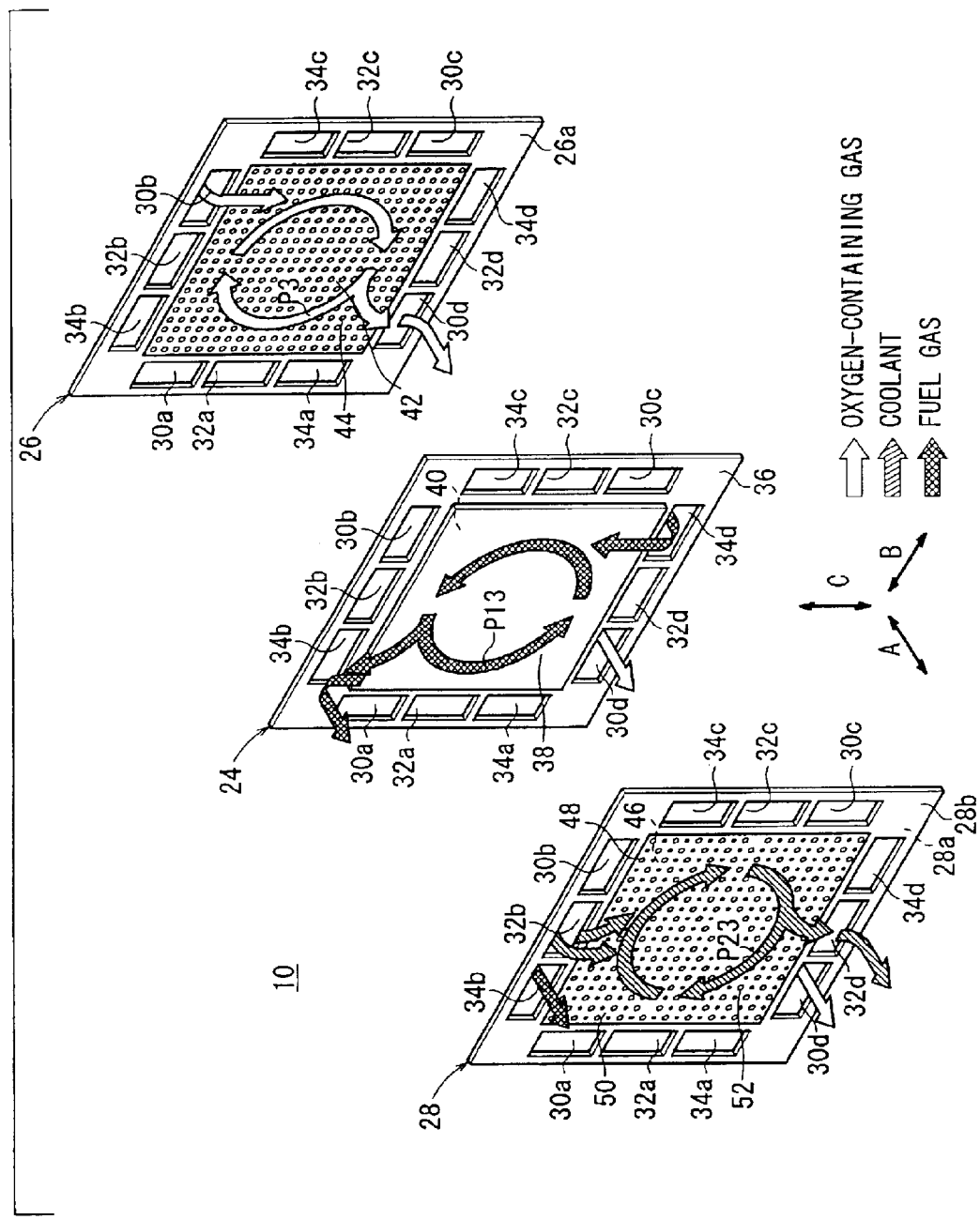
FIG. 10 is an exploded perspective view of the fuel cell in a third position.
Figure 11:
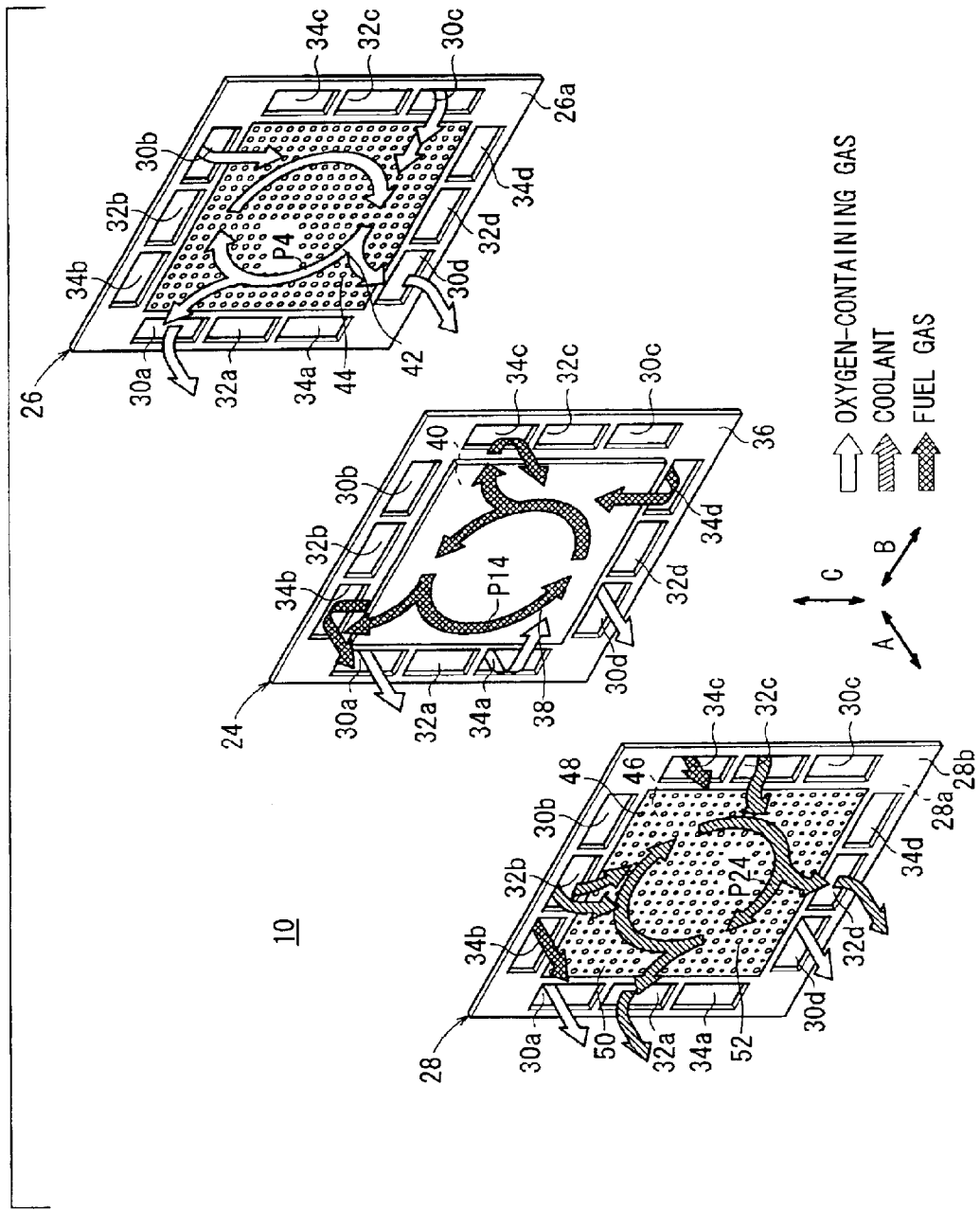
FIG. 11 is an exploded perspective view of the fuel cell in a fourth position.

During this time, the oxygen-containing gas supplied to the oxygen-containing gas flow field 42 and the fuel gas supplied to the fuel gas flow field 46 flow as substantial counterflows at all times. For example, in the first positions P1, P11 shown in FIG. 2, the second positions P2, P12 shown in FIG. 9, the third positions P3, P13 shown in FIG. 10, and the fourth positions P4, P14 shown in FIG. 11, the oxygen-containing gas and the fuel gas flow as substantial counterflows.

Consequently, the oxygen-containing gas discharge port of the oxygen-containing gas flow field 42 which tends to be highly humid due to produced water confronts the fuel gas supply port of the fuel gas flow field 46 which is supplied with the fuel gas that has relatively low humidity.

Therefore, the moisture moves from the oxygen-containing gas outlet to the fuel gas inlet across the membrane electrode assembly 24, thus removing condensed water from the oxygen-containing gas flow field 42 and the desired humidity is kept in the fuel gas flow field 46 with the supply of the fuel gas having low or no humidity.

In the coolant flow field 50, while the oxygen-containing gas flow field 42 is being shifted successively from the first position P1 to the eighth position P8, the oxygen-containing gas supplied to the oxygen-containing gas flow field 42 and the coolant supplied to the coolant flow field 50 flow as substantially parallel flows (see FIGS. 5 and 8). These parallel flows of the oxygen-containing gas and the coolant are clearly illustrated in the first positions P1, P21 through the fourth positions P4, P24 as shown in FIGS. 2, 9, 10, and 11.

The oxygen-containing gas outlet of the oxygen-containing gas flow field 42 is heated by the coolant which has its temperature increased by having cooled the membrane electrode assembly 24. Therefore, although the oxygen-containing gas outlet is made highly humid by the produced water, its relatively humidity is lowered by the heat from the coolant, and the oxygen-containing gas outlet is prevented from condensing water therein.

According to the first embodiment, furthermore, as shown in FIG. 1, a plurality of fuel cells 10 are vertically stacked to provide the fuel cell stack 14. The vertical fuel cell stack 14 permits condensed water produced therein to move smoothly by gravity and be efficiently discharged therefrom rather than staying downstream in the fuel cells 10 which would be erected if the fuel cells 10 were stacked substantially horizontally.

It is also possible to make effective use of the water produced by the reaction in the fuel cell to reduce the stoichiometric ratios of the fuel gas and the oxygen-containing gas. The fuel cell 10 according to the present invention is much less costly and hence is economical because it needs no humidifier and no complex water retriever.

FIG. 12 shows in exploded perspective a fuel cell 100 according to a second embodiment of the present invention. The constituent elements of the fuel cell 100 which are identical to those of the fuel cell 10 according to the first embodiment are denoted by identical reference characters, and will not be described in detail below. The constituent elements of fuel cells according to third and fourth embodiments to be described below which are identical to those of the fuel cell 10 according to the first embodiment are also denoted by identical reference characters, and will not be described in detail below.

As shown in FIG. 12, the fuel cell 100 has a membrane electrode assembly 102 and first and second separators 104, 106 of metal which sandwich the membrane electrode assembly 102 therebetween. The fuel cell 100 has, defined in one end thereof in the direction indicated by the arrow B, a first oxygen-containing gas hole 30a, a first coolant hole 32a, and a first fuel gas hole 34a which extend through the membrane electrode assembly 102 and the first and second separators 104, 106 in the direction indicated by the arrow A, and are arranged in the direction indicated by the arrow C. The fuel cell 100 also has, defined in the opposite end thereof in the direction indicated by the arrow B, a second fuel gas hole 34b, a second coolant hole 32b, and a second oxygen-containing gas hole 30b which extend through the membrane electrode assembly 102 and the first and second separators 104, 106 in the direction indicated by the arrow A, and are arranged in the direction indicated by the arrow C.

The first separator 104 has an oxygen-containing gas flow field (fluid flow field) 110 defined thereon by a plurality of bosses 44 and a plurality of guide ribs 112 integrally connecting predetermined bosses 44. The guide ribs 112 are shaped and located to allow an oxygen-containing gas supplied from the first oxygen-containing gas hole 30a to the oxygen-containing gas flow field 110 to smoothly flow circularly along the electrode surfaces and also to allow the oxygen-containing gas which has been used to be discharged from the second oxygen-containing gas hole 30b.

The second separator 106 has a fuel gas flow field (fluid flow field) 114 on its surface facing the anode 38 by a plurality of bosses 48 and a plurality of guide ribs 116 integrally connecting predetermined bosses 48. The guide ribs 116 are shaped and located to allow a fuel gas supplied from the first fuel gas hole 34a to the fuel gas flow field 114 to smoothly flow circularly along the electrode surfaces and also to allow the fuel gas which has been used to be discharged from the second fuel gas hole 34b.

The second separator 106 also has a coolant flow field (fluid flow field) 118 defined thereon opposite to the fuel gas flow field 114 by a plurality of bosses 52 and a plurality of guide ribs 120 integrally connecting predetermined bosses 52. The guide ribs 120 are shaped and located to allow a coolant supplied from the first coolant hole 32a to the coolant flow field 118 to smoothly flow circularly along the electrode surfaces and also to allow the coolant which has been used to be discharged from the second coolant hole 32b.

According to the second embodiment, when the oxygen-containing gas is supplied from the first oxygen-containing gas hole 30a to the oxygen-containing gas flow field 110 on the first separator 104, the oxygen-containing gas is guided by the bosses 44 and the guide ribs 112 to flow circularly along the surface of the cathode 40, and is partly discharged into the second oxygen-containing gas hole 30b.

Thus, simply connecting the first oxygen-containing gas hole 30a as the oxygen-containing gas supply port, the oxygen-containing gas flows circularly in the oxygen-containing gas flow field 110, and various states on the electrode surfaces of the cathode 40 are easily uniformized, as with the first embodiment.

As shown in FIG. 13A, the fuel gas introduced from the first fuel gas hole 34a into the fuel gas flow field 114 is guided by the bosses 48 and the guide ribs 116 to flow circularly in the fuel gas flow field 114, and is partly discharged into the second fuel gas hole 34b.

In the coolant flow field 118, the coolant is guided by the bosses 52 and the guide ribs 120 to flow circularly simply by connecting the first coolant hole 32a as the coolant supply port and the second coolant hole 32b as the coolant discharge port.

According to the second embodiment, the first oxygen-containing gas hole 30a is permanently used as the oxygen-containing gas supply port and the second oxygen-containing gas hole 30b is permanently used as the oxygen-containing gas discharge port, with the result that it is not necessary to change the oxygen-containing gas supply port and the oxygen-containing gas discharge port. Accordingly, since there is no need to change the passages for the oxygen-containing gas, the fuel cell 10 and its associated equipment may be simplified and reduced in size.

According to the second embodiment, the oxygen-containing gas supply port and the oxygen-containing gas discharge port are provided respectively by the first oxygen-containing gas hole 30a and the second oxygen-containing gas hole 30b, each comprising a single hole. However, each of the oxygen-containing gas supply port and the oxygen-containing gas discharge port may be provided by two or more holes. The guide ribs 116 shown in FIG. 13A may be replaced with guide ribs 116a, 116b, 116c shown in FIGS. 13B through 13D, respectively, for causing the fuel gas to flow circularly. Similarly, the guide ribs 112 defining the oxygen-containing gas flow field 110 as shown in FIG. 12 may also be replaced with guide ribs 116a, 116b, 116c shown in FIGS. 13B through 13D, respectively, for causing the oxygen-containing gas to flow circularly.

Figure 14:
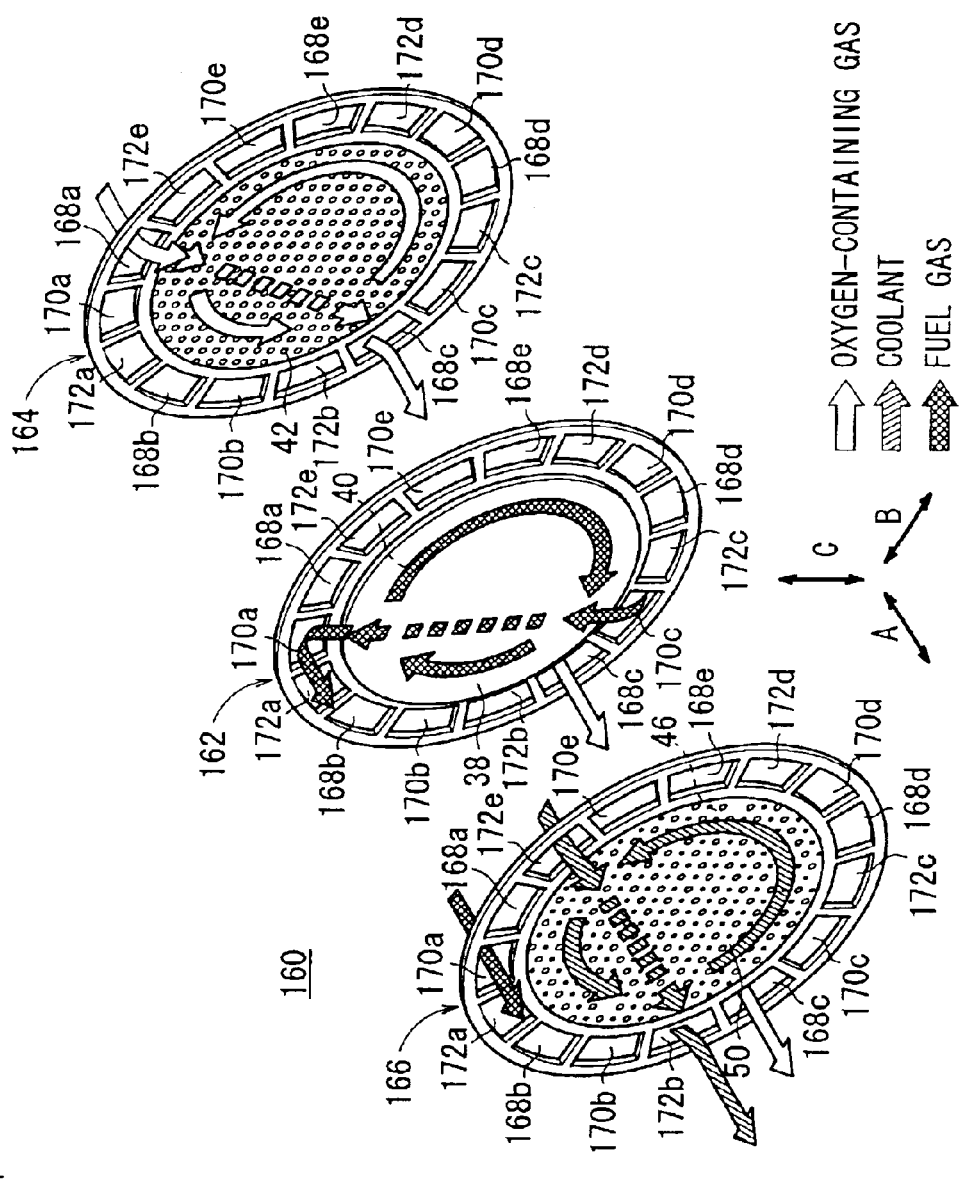
FIG. 14 is an exploded perspective view showing main components of a fuel cell according to a third embodiment of the present invention.

FIG. 14 shows in exploded perspective main components of a fuel cell 160 according to a third embodiment of the present invention.

As shown in FIG. 14, the fuel cell 160 has a substantially disk-shaped membrane electrode assembly (electrolyte electrode assembly) 162 and substantially disk-shaped first and second separators 164, 166 of metal which sandwich the membrane electrode assembly 162 therebetween. The fuel cell 160 has, defined in its outer circumferential edge portions, a first oxygen-containing gas hole 168a, a second oxygen-containing gas hole 168b, a third oxygen-containing gas hole 168c, a fourth oxygen-containing gas hole 168d, and a fifth oxygen-containing gas hole 168e which are positioned radially outwardly of the anode 38 and the cathode 40 and spaced at predetermined angular intervals. The first through fifth oxygen-containing gas holes 168a through 168e extend through the membrane electrode assembly 162 and the first and second separators 164, 166 in the direction indicated by the arrow A.

The fuel cell 160 also has a first fuel gas hole 170a and a first coolant hole 172a which are defined its outer circumferential edge portions and positioned circumferentially between the first oxygen-containing gas hole 168a and the second oxygen-containing gas hole 168b, a second fuel gas hole 170b and a second coolant hole 172b which are defined its outer circumferential edge portions and positioned circumferentially between the second oxygen-containing gas hole 168b and the third oxygen-containing gas hole 168c, and a third fuel gas hole 170c and a third coolant hole 172c which are defined its outer circumferential edge portions and positioned circumferentially between the third oxygen-containing gas hole 168c and the fourth oxygen-containing gas hole 168d.

The fuel cell 160 also has a fourth fuel gas hole 170d and a fourth coolant hole 172d which are defined its outer circumferential edge portions and positioned circumferentially between the fourth oxygen-containing gas hole 168d and the fifth oxygen-containing gas hole 168e, and a fifth fuel gas hole 170e and a fifth coolant hole 172e which are defined its outer circumferential edge portions and positioned circumferentially between the fifth oxygen-containing gas hole 168e and the first oxygen-containing gas hole 168a.

Figure 15:
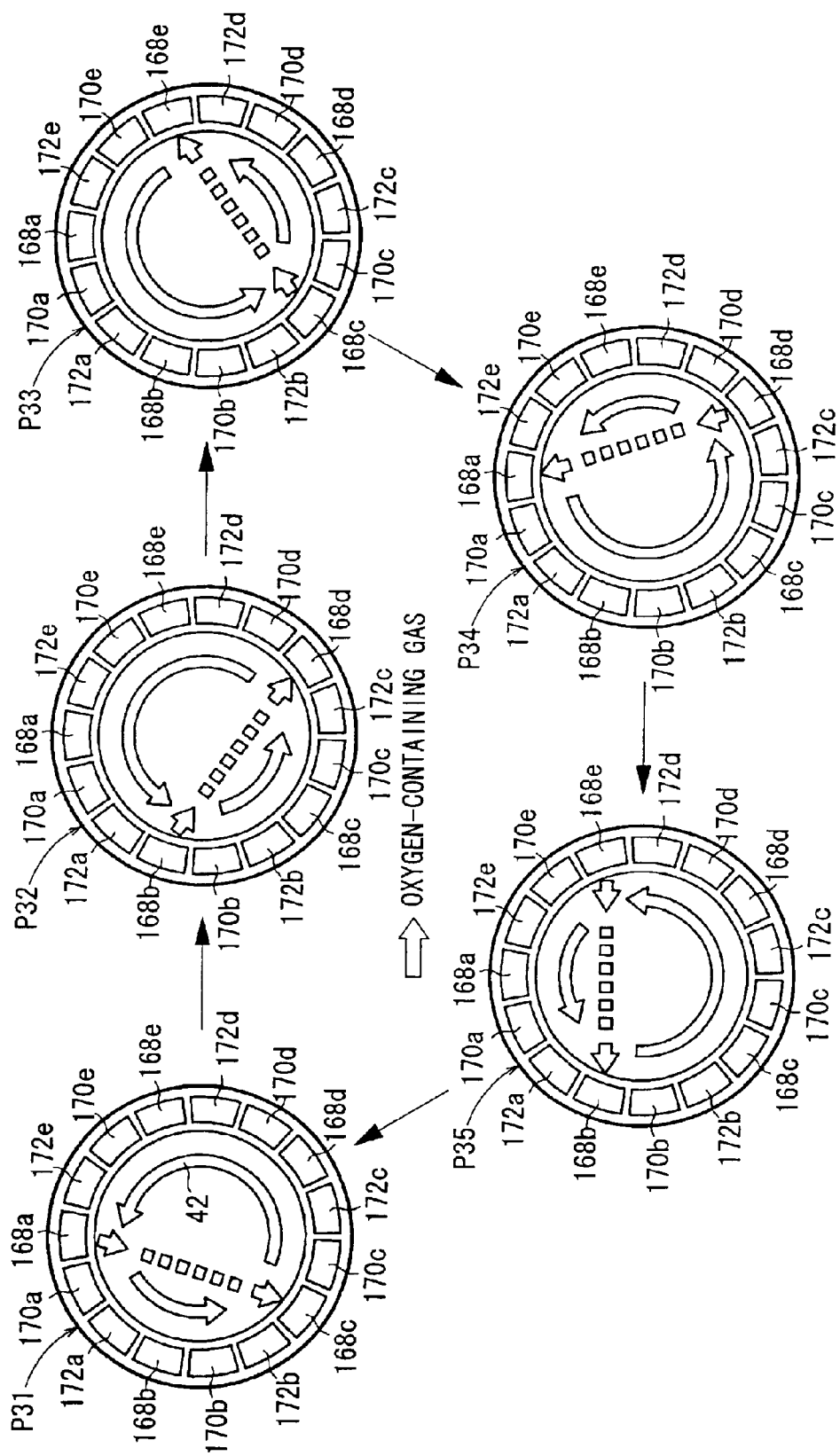
FIG. 15 is a view illustrative of the manner in which the direction of a flow in an oxygen-containing gas flow field is changed in the fuel cell shown in FIG. 14.

As shown in FIG. 15, as for the oxygen-containing gas flow field 42, one of the first through fifth oxygen-containing gas holes 168a through 168e is selected as the oxygen-containing gas supply port, and another one of the first through fifth oxygen-containing gas holes 168a through 168e is selected as the oxygen-containing gas discharge port. The first through fifth oxygen-containing gas holes 168a through 168e are selectively used successively in a first position P31, a second position P32, a third position P33, a fourth position P34, and a fifth position P35.

Figure 16:
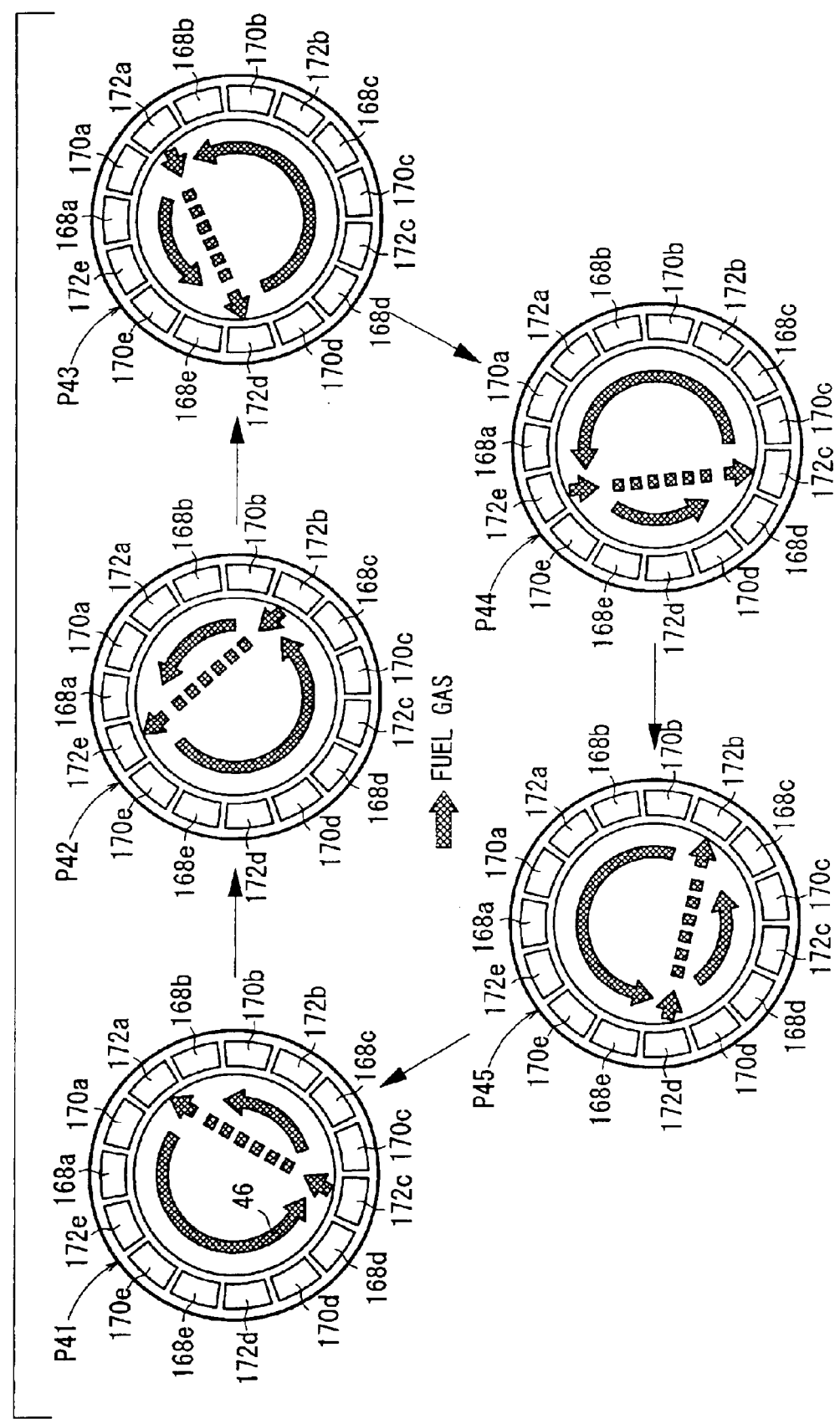
FIG. 16 is a view illustrative of the manner in which the direction of a flow in a fuel gas flow field is changed in the fuel cell shown in FIG. 14.

As shown in FIG. 16, as for the fuel gas flow field 46, one of the first through fifth fuel gas holes 170a through 170e is selected as the fuel gas supply port, and another one of the first through fifth fuel gas holes 170a through 170e is selected as the fuel gas discharge port. The first through fifth fuel gas holes 170a through 170e are selectively used successively in a first position P41, a second position P42, a third position P43, a fourth position P44, and a fifth position P45.

Figure 17:
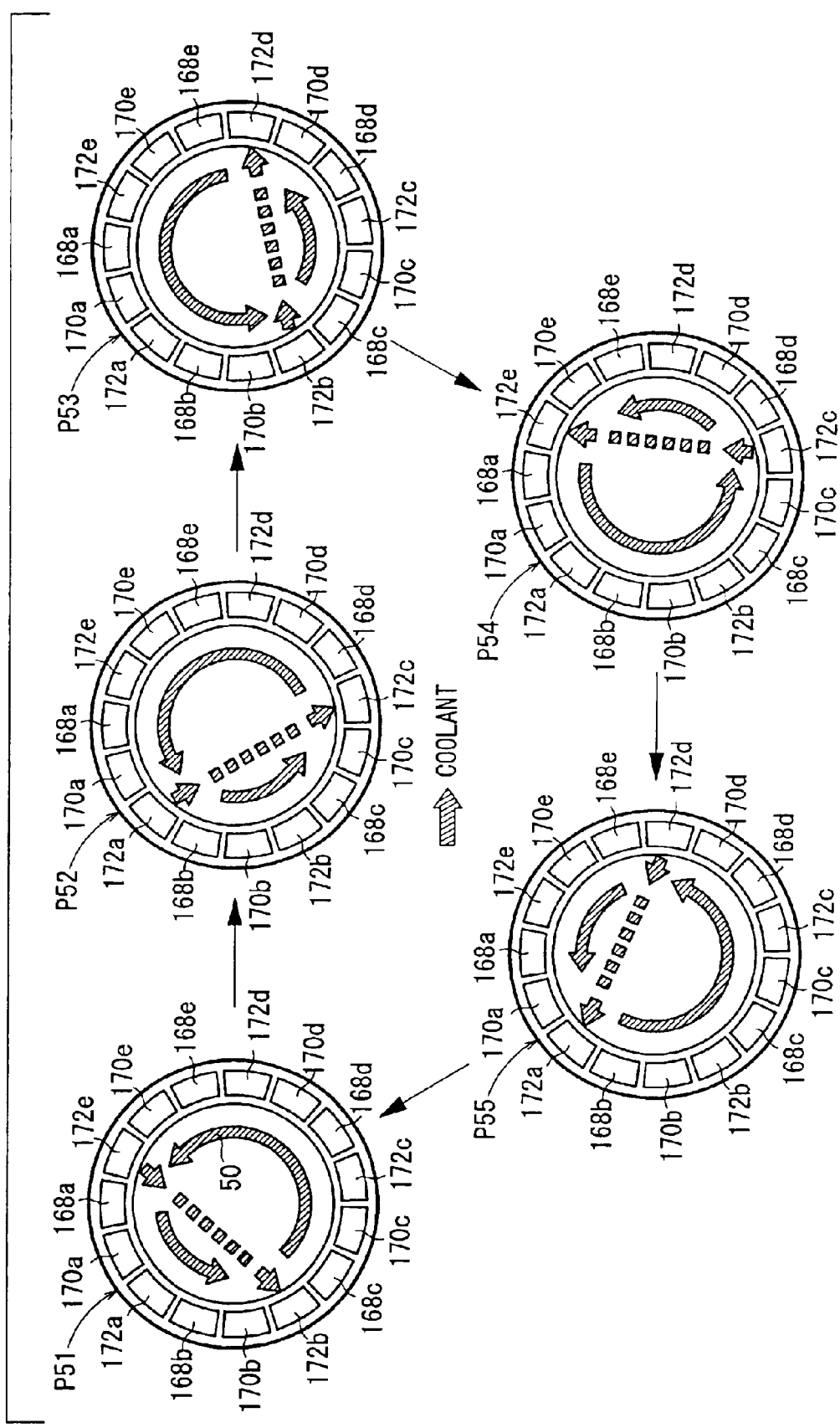
FIG. 17 is a view illustrative of the manner in which the direction of a flow in a coolant flow field is changed in the fuel cell shown in FIG. 14.

As shown in FIG. 17, as for the coolant flow field 50, one of the first through fifth coolant holes 172a through 172e is selected as the coolant supply port, and another one of the first through fifth coolant holes 172a through 172e is selected as the coolant discharge port. The first through fifth coolant holes 172a through 172e are selectively used successively in a first position P51, a second position P52, a third position P53, a fourth position P54, and a fifth position P55.

According to the third embodiment, the oxygen-containing gas flow field 42, the fuel gas flow field 46, and the coolant flow field 50 are successively changed in synchronism with the fluid holes being selectively used in the first positions P31, P41, P51 through the fifth positions P35, P45, P55. As the oxygen-containing gas flow field 42, the fuel gas flow field 46, and the coolant flow field 50 are thus successively changed, the oxygen-containing gas, the fuel gas, and the coolant are introduced from the respective supply ports and discharged into the respective discharge ports. Therefore, the oxygen-containing gas, the fuel gas, and the coolant flow circularly well in the oxygen-containing gas flow field 42, the fuel gas flow field 46, and the coolant flow field 50, respectively.

With respect to the oxygen-containing gas flow field 42, for example, the first oxygen-containing gas hole 168*a* is used as the oxygen-containing gas supply port, and the third oxygen-containing gas hole 168*c* is used as the oxygen-containing gas discharge port (see the first position P31). When the first position P31 switches to the second position P32, the first and second oxygen-containing gas holes 168*a*, 168*b* are temporarily used as the oxygen-containing gas supply ports, and then only the second oxygen-containing gas hole 168*b* is used as the oxygen-containing gas supply port. The third and fourth oxygen-containing gas holes 168*c*, 168*d* are temporarily used as the oxygen-containing gas discharge port, and then only the fourth oxygen-containing gas hole 168*d* is used as the oxygen-containing gas discharge port.

According to the third embodiment, therefore, when the first position P31 switches to the second position P32, the flow of the oxygen-containing gas is not stopped, allowing the fuel cell 160 to reliably produce a stable output of electric energy. The third embodiment offers the same advantages as those of the first and second embodiments.

According to the third embodiment, furthermore, in the oxygen-containing gas flow field 42 and the fuel gas flow field 46, the directions in which the oxygen-containing gas and the fuel gas flow are changed in synchronism with each other, and the oxygen-containing gas and the fuel gas flow as substantial counterflows at all times. The oxygen-containing gas in the oxygen-containing gas flow field 42 and the coolant in the coolant flow field 50 flow as substantially parallel flows at all times. Consequently, the water produced by the reaction can effectively be used, and the ability of the fuel cell 160 to generate electric energy is increased, as with the first and second embodiments.

According to the third embodiment, moreover, the electric surface can be maintained in a uniform state by changing the number of inlets and outlets depending on the magnitude of the output of the fuel cell 160, reductions in the output of the fuel cell 160, the distribution of water on the electrode surfaces, and the distribution of current densities on the electrode surfaces.

For example, if the fuel cell 160 produces a low output, then since the oxygen-containing gas flows at a low rate, two of the first through fifth oxygen-containing gas holes 168*a* through 168*e* are used as the oxygen-containing gas supply ports, and one of the first through fifth oxygen-containing gas holes 168*a* through 168*e* is used as the oxygen-containing gas discharge port. If the fuel cell 160 produces a high output, then since the oxygen-containing gas flows at a high rate, one of the first through fifth oxygen-containing gas holes 168*a* through 168*e* is used as the oxygen-containing gas supply port, and two of the first through fifth oxygen-containing gas holes 168*a* through 168*e* are used as the oxygen-containing gas discharge ports. Thus, any pressure loss in the oxygen-containing gas supply port and the oxygen-containing gas discharge port is reduced, improving the ability to distribute the oxygen-containing gas in the fuel cell 160.

Figure 18:
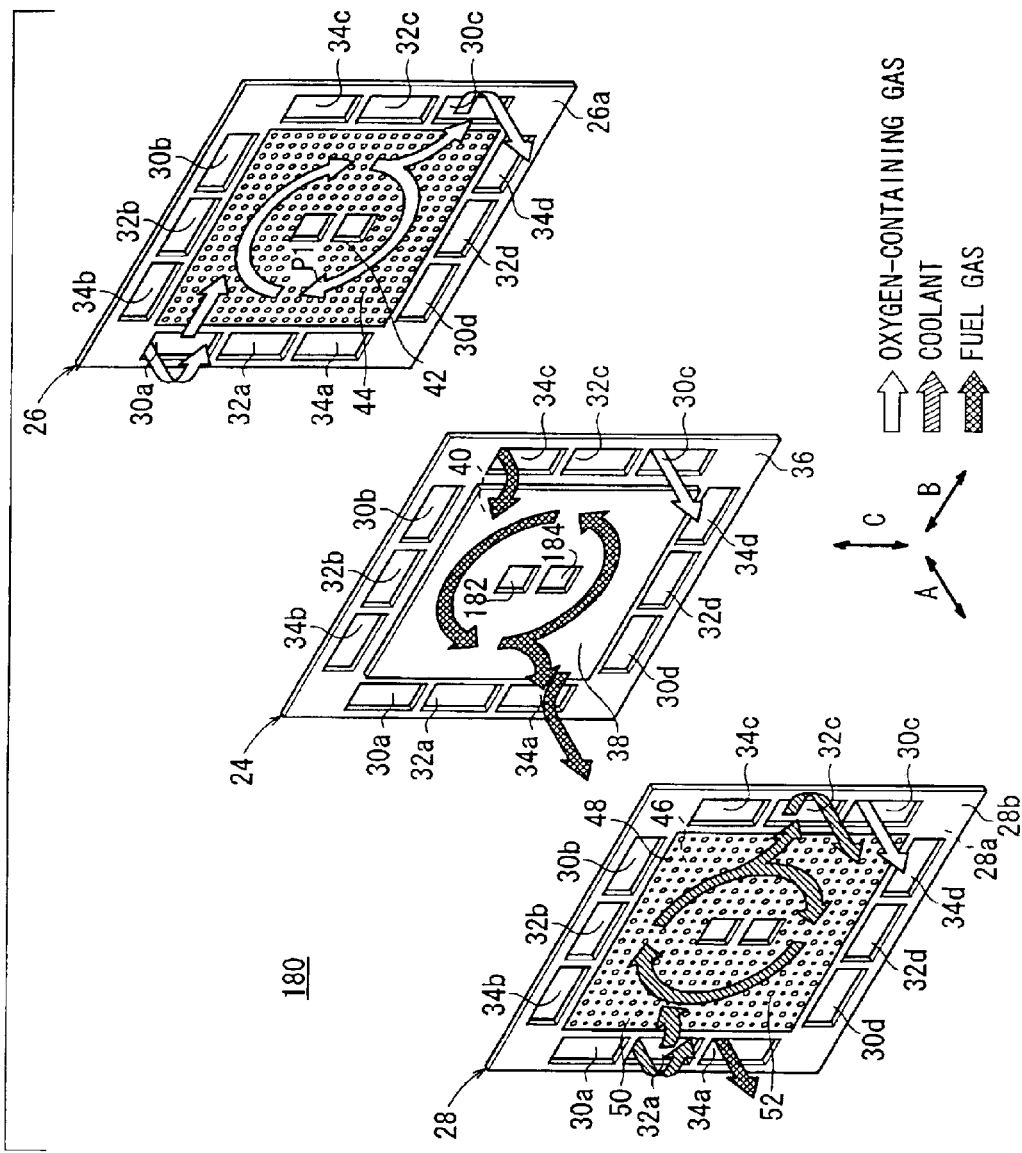
FIG. 18 is an exploded perspective view showing main components of a fuel cell according to a fourth embodiment of the present invention.

FIG. 18 shows in exploded perspective main components of a fuel cell 180 according to a fourth embodiment of the present invention.

As shown in FIG. 18, the fuel cell 180 has an inner oxygen-containing gas hole 182 and an inner fuel gas hole 184 defined in the electrode surfaces and extending through the membrane electrode assembly 24 and the first and second separators 26, 28 in the direction indicated by the arrow A. The inner oxygen-containing gas hole 182 can be used selectively as the oxygen-containing gas supply port and the oxygen-containing gas discharge port, and the inner fuel gas hole 184 can be used selectively as the fuel gas supply port and the fuel gas discharge port.

Figure 19:
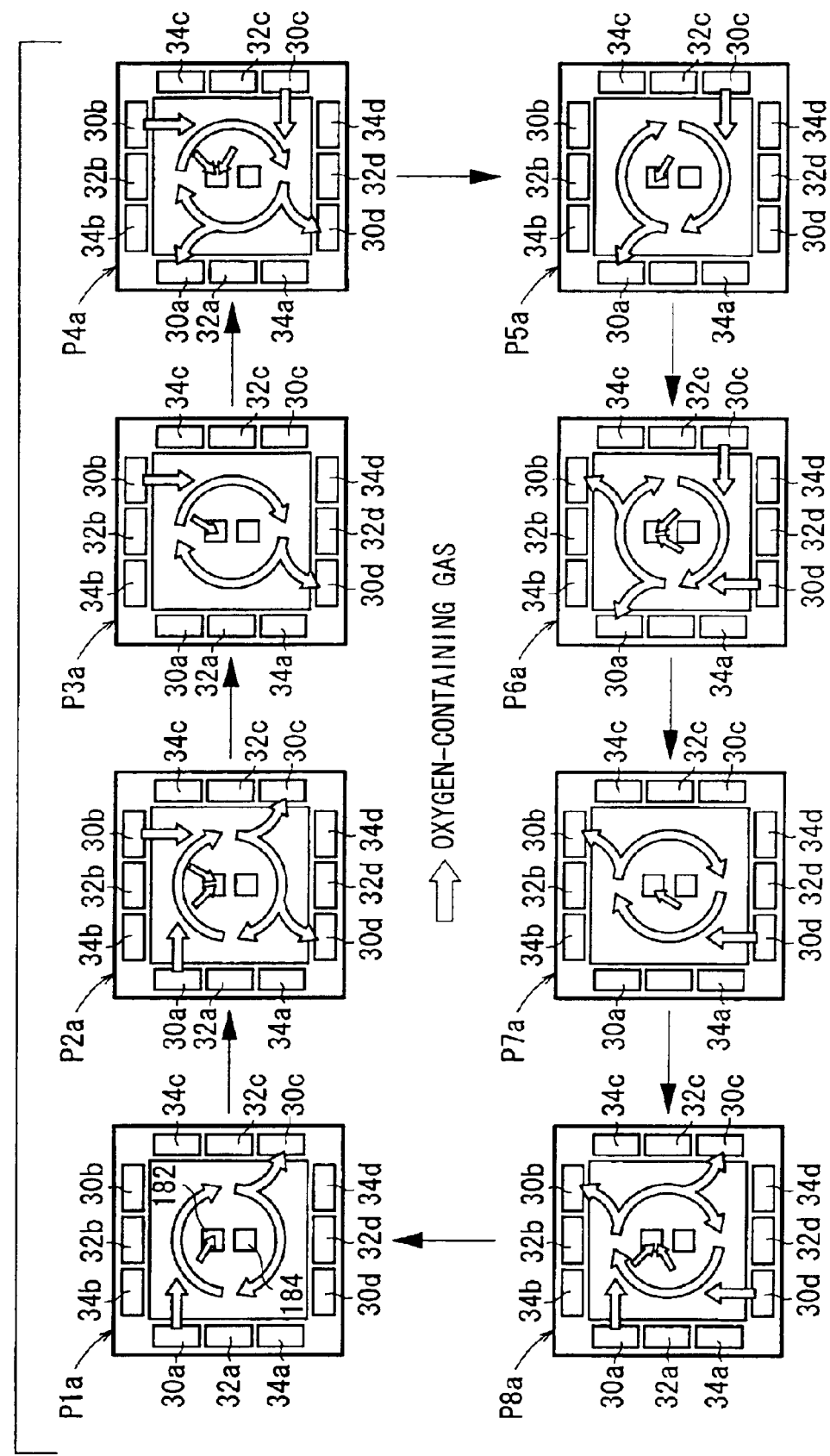
FIG. 19 is a view illustrative of the manner in which an inner oxygen-containing gas hole is used as an oxygen-containing gas discharge port in the fuel cell shown in FIG. 18.

The inner oxygen-containing gas hole 182 is selectively used as the oxygen-containing gas discharge port by successively switching first through eighth positions P1*a* through P8*a*, as shown in FIG. 19.

Figure 20:
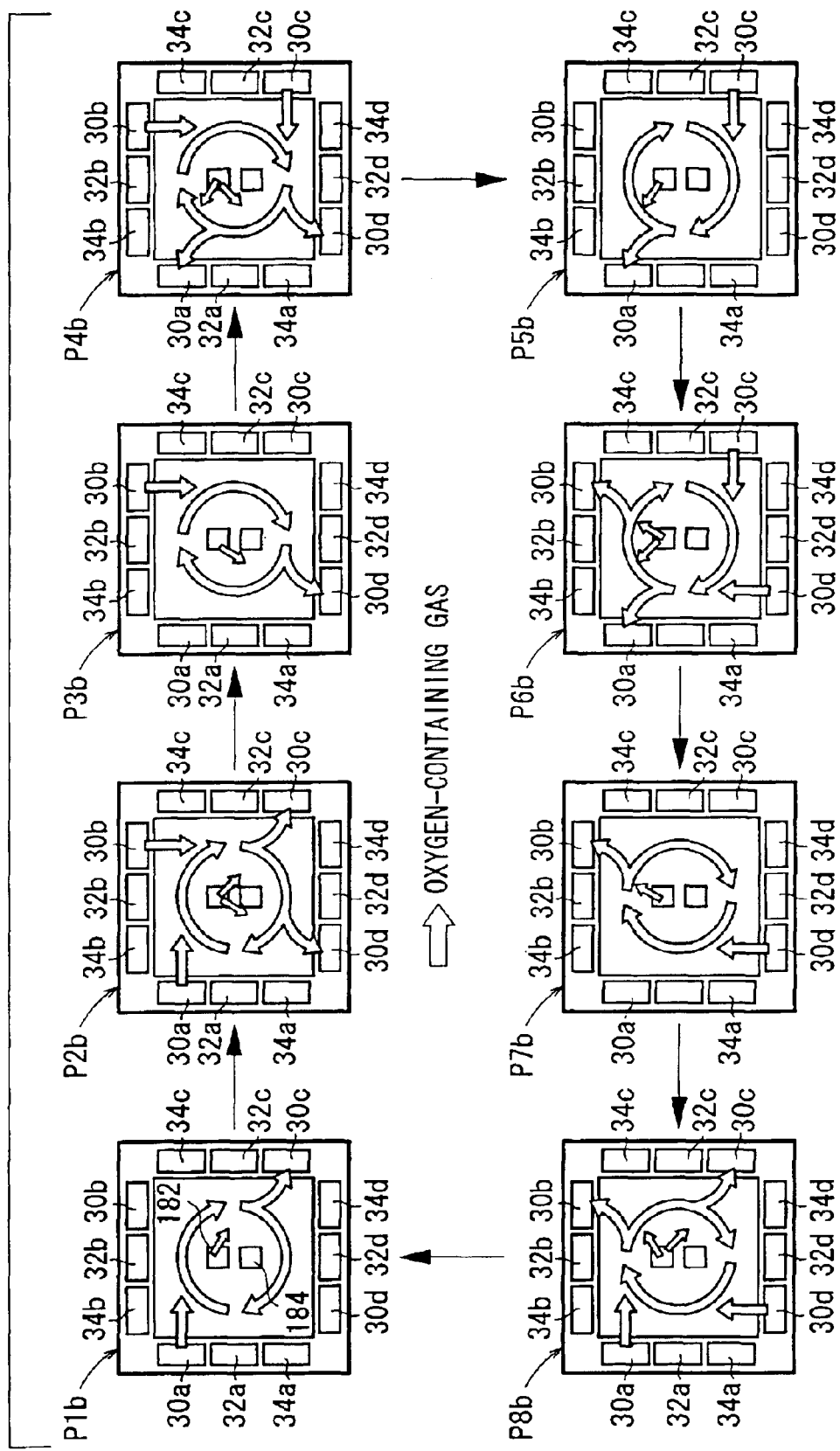
FIG. 20 is a view illustrative of the manner in which the inner oxygen-containing gas hole is used as an oxygen-containing gas supply port in the fuel cell shown in FIG. 18.
Figure 21:
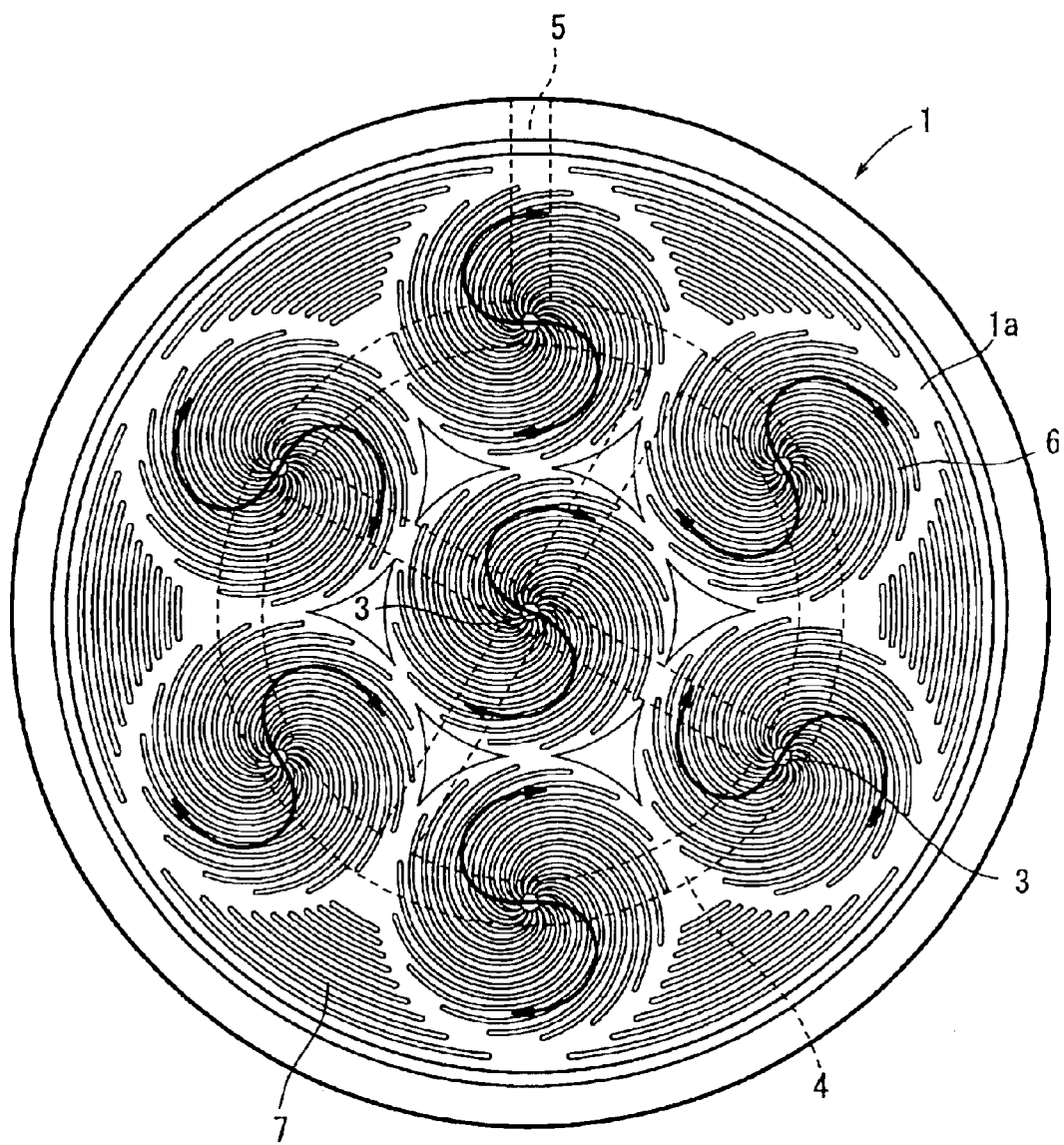
FIG. 21 is a front view of a separator of a conventional fuel cell.

The inner oxygen-containing gas hole 182 is selectively used as the oxygen-containing gas supply port by successively switching first through eighth positions P1*b* through P8*b*, as shown in FIG. 20.

According to the fourth embodiment, as described above, the inner oxygen-containing gas hole 182 is defined substantially centrally in the electrode surfaces and used as the oxygen-containing gas supply port or the oxygen-containing gas discharge port. Therefore, the oxygen-containing gas is effectively prevented from staying or remaining stagnant substantially centrally on the electrode surfaces. The electric surface can thus be maintained in a uniform state, and the ability of the fuel cell 180 to generate electric energy is increased.

If the fuel cell 180 produces a low output, then the inner oxygen-containing gas hole 182 and the inner fuel gas hole 184 are not used. If the fuel cell 180 produces a high output, then the inner oxygen-containing gas hole 182 and the inner fuel gas hole 184 are used. Specifically, based on the direct relationship between the magnitude of the output of the fuel cell 180 and the magnitude of the consumption of the reactant gases, the supply and discharge of the reactant gases is reduced if the fuel cell 180 produces a low output, and the supply and discharge of the reactant gases is increased if the fuel cell 180 produces a high output. In this manner, the fuel cell 180 is able to reliably produce a desired output.

The fuel cell 180 may have a plurality of inner oxygen-containing gas holes 182 and a plurality of inner fuel gas holes 184, and the number of inner oxygen-containing gas holes 182 to be used and the number of inner fuel gas holes 184 to be used may be changed depending on the load on the fuel cell 180. In this case, also based on the above relationship, the supply and discharge of the reactant gases is reduced if the fuel cell 180 produces a low output, and the supply and discharge of the reactant gases is increased if the fuel cell 180 produces a high output. In this manner, the fuel cell 180 is able to reliably produce a desired output.

In addition, the interval of time at which the oxygen-containing gas supply port and the oxygen-containing gas discharge port are switched may be made shorter when the fuel cell 180 produces a low output than when the fuel cell 180 produces a high output. In this case, if the fuel cell 180 produces a high output, then since the reactant gases are consumed at a high rate, the interval of time at which the oxygen-containing gas supply port and the oxygen-containing gas discharge port are switched is relatively reduced, uniformizing a distribution of reactant gases on the electrode surfaces thereby to supply the reactant gases stably over the entire electrode surfaces for the fuel cell 180 to produce a stable output.

Furthermore, depending on the load on the fuel cell 180, the interval of time at which the supply and discharge of the reactant gases is switched may be changed, or the numbers of gas supply ports and gas discharge ports that are simultaneously used may be changed. By changing the above interval of time and the numbers of gas supply ports and gas discharge ports that are simultaneously used depending on the load on the fuel cell 180, it is possible to maintain an optimum distribution of reactant gases on the electrode surfaces depending on a change in the output of the fuel cell 180, and the fuel cell 180 can produce a stable output immediately after the change in the output of the fuel cell 180.

The first and second separators 26, 28 and the other separators described above have been illustrated as being made of metal. However, they may be made of carbon.

With the fuel cell and the method of operating the fuel cell according to the present invention, since the fluids flow circularly in the fluid flow fields along the electrode surfaces, it is possible to uniformize the distribution of current densities, the distribution of produced water, the distribution of humidities, and the distribution of temperatures on the electrode surfaces. Thus, the characteristics of the fuel cell to generate electric energy are improved. The power generation is uniformly performed over the entire electrode surfaces, and the entire electrode surfaces are uniformly utilized. Consequently, the durability of the electrolyte electrode assembly is effectively improved.

Although certain preferred embodiments of the present invention have been shown and described in detail, it should be understood that various changes and modifications may be made therein without departing from the scope of the appended claims.

What is claimed is:

1. A fuel cell including an electrolyte electrode assembly, and a pair of separators for sandwiching said electrolyte electrode assembly, said electrolyte electrode assembly including a pair of electrodes and an electrolyte interposed between said electrodes, said fuel cell further comprising:

a plurality of fluid holes positioned outside of said electrodes and extending through said separators for passing a fluid, which comprises at least one of an oxygen-containing gas, a fuel gas, and a coolant, through said separators; and at least one fluid flow field selectively connected to said fluid holes which are used as a fluid supply port and a fluid discharge port, respectively, for causing said fluid to flow circularly along a surface of said electrode, wherein said fluid holes used as said fluid supply port and said fluid discharge port are subsequently changed to said fluid holes on an adjacent side of one of said separators around a perimeter of said separator, thereby causing the fluid to flow circularly in said fluid flow field.

2. A fuel cell according to claim 1, wherein said selected fluid holes are fixedly used as said fluid supply port and said fluid discharge port, respectively, for causing said fluid to flow circularly in said fluid flow field.

3. A fuel cell according to claim 1, wherein said fluid holes include at least one inner hole defined in said electrodes.

4. A fuel cell according to claim 1, wherein said fluid flow field is defined by an embossed structure on said separator.

5. A fuel cell according to claim 4, wherein said embossed structure includes guide ribs.

6. A fuel cell according to claim 1, wherein said fuel cell includes at least two fluid flow fields, and said fluid flow fields include a fuel gas flow field and an oxygen-containing gas flow field for being supplied with a fuel gas and an oxygen-containing gas, respectively, which flow as counterflows, respectively, through said fuel gas flow field and said oxygen-containing gas flow field.

7. A fuel cell according to claim 6, wherein said fluid flow fields further include a coolant flow field for being supplied with a coolant flowing through said coolant flow field parallel to said oxygen-containing gas.

8. A fuel cell according to claim 1, wherein said electrolyte electrode assembly and said separators are stacked vertically.

9. A fuel cell including an electrolyte electrode assembly, and a pair of separators for sandwiching said electrolyte electrode assembly, said electrolyte electrode assembly including a pair of electrodes and an electrolyte interposed between said electrodes, said fuel cell further comprising:

a plurality of fluid holes positioned outside of said electrodes and extending through said separators for passing a fluid, which comprises at least one of an oxygen-containing gas, a fuel gas, and a coolant, through said separators; and at least one fluid flow field selectively connected to said plurality of fluid holes which are used as a fluid supply port and a fluid discharge port, respectively, for causing said fluid to flow circularly along a surface of said electrode, wherein said fluid flow field is defined by an embossed structure on said separator and said embossed structure includes guide ribs.

10. A fuel cell according to claim 9, wherein said selected fluid holes are fixedly used as said fluid supply port and said fluid discharge port, respectively, for causing said fluid to flow circularly in said fluid flow field.

11. A fuel cell according to claim 9, wherein said fluid holes include at least one inner hole defined in said electrodes.

12. A fuel cell according to claim 9, wherein said fuel cell includes at least two fluid flow fields, and said fluid flow fields include a fuel gas flow field and an oxygen-containing gas flow field for being supplied with a fuel gas and an oxygen-containing gas, respectively, which flow as counterflows, respectively, through said fuel gas flow field and said oxygen-containing gas flow field.

13. A fuel cell according to claim 12, wherein said fluid flow fields further include a coolant flow field for being supplied with a coolant flowing through said coolant flow field parallel to said oxygen-containing gas.

14. A fuel cell according to claim 9, wherein said electrolyte electrode assembly and said separators are stacked vertically.

* * * * *